United States Patent
Hoffman et al.

(10) Patent No.: US 12,485,157 B2
(45) Date of Patent: Dec. 2, 2025

(54) METHOD OF TREATING COVID-19

(71) Applicant: Pfizer Inc., New York, NY (US)

(72) Inventors: Robert Louis Hoffman, San Diego, CA (US); Robert Steven Kania, Del Mar, CA (US); Dafydd Rhys Owen, Concord, MA (US); Martin Youngjin Pettersson, Littleton, MA (US); Matthew Forrest Sammons, Quincy, MA (US); Jamison Bryce Tuttle, Marblehead, MA (US)

(73) Assignee: Pfizer Inc., New York, NY (US)

( * ) Notice: Subject to any disclaimer, the term of this patent is extended or adjusted under 35 U.S.C. 154(b) by 589 days.

(21) Appl. No.: 17/906,109

(22) PCT Filed: Apr. 1, 2021

(86) PCT No.: PCT/IB2021/052738
§ 371 (c)(1),
(2) Date: Sep. 12, 2022

(87) PCT Pub. No.: WO2021/205296
PCT Pub. Date: Oct. 14, 2021

(65) Prior Publication Data
US 2023/0105838 A1    Apr. 6, 2023

Related U.S. Application Data

(60) Provisional application No. 63/155,530, filed on Mar. 2, 2021, provisional application No. 63/005,376, filed on Apr. 5, 2020.

(51) Int. Cl.
| | | |
|---|---|---|
| A61K 31/404 | (2006.01) | |
| A61K 31/167 | (2006.01) | |
| A61K 31/405 | (2006.01) | |
| A61K 31/513 | (2006.01) | |
| A61K 31/519 | (2006.01) | |
| A61K 31/573 | (2006.01) | |
| A61K 31/609 | (2006.01) | |
| A61K 31/706 | (2006.01) | |
| A61K 38/00 | (2006.01) | |
| A61K 39/00 | (2006.01) | |
| A61P 31/14 | (2006.01) | |

(52) U.S. Cl.
CPC .......... *A61K 38/005* (2013.01); *A61K 31/167* (2013.01); *A61K 31/405* (2013.01); *A61K 31/513* (2013.01); *A61K 31/519* (2013.01); *A61K 31/573* (2013.01); *A61K 31/609* (2013.01); *A61K 31/706* (2013.01); *A61K 39/00* (2013.01); *A61P 31/14* (2018.01)

(58) Field of Classification Search
CPC .............................. A61K 31/404; A61P 31/12
USPC .................................................. 514/414, 415
See application file for complete search history.

(56) References Cited

FOREIGN PATENT DOCUMENTS

| | | | |
|---|---|---|---|
| WO | 2005/113580 A1 | 12/2005 | |
| WO | 200513580 | 12/2005 | |
| WO | WO 2021-176369 A1 * | 9/2021 | ......... A61K 31/4025 |
| WO | 2021/205296 A1 | 10/2021 | |

OTHER PUBLICATIONS

Hoffman, Robert L., et al., "Discovery of Ketone-Based Covalent Inhibitors of Coronavirus 3CL Proteases for the Potential Therapeutic Treatment of COVID-19", Journal of Medicinal Chemistry, Oct. 15, 2020, pp. 12725-12747, 63(21).
International Patent Application No. PCT/IB2021/052738, filed Apr. 1, 2021, Search Report and Written Opinion, mailed Jun. 25, 2021, 16 pages.
Stoermer, Martin, "Homology Models of Wuhan Coronavirus 3CLpro Protease", Feb. 5, 2020, pp. 1-11, XP055814654, https:chemrxiv. org/articles/preprint/Homology_Models_of_Wuhan_Coronavirus_3CLprp_Protease/11637294/1.
Antonio Caldaria, COVID-19 and SARS: Differences and similarities, Mar. 21, 2020, Wiley, Dermatologic Therapy, 1-2.
International Preliminary Report on Patentability issued in PCT/IB2021/052738; mailed on Oct. 20, 2022; 8 pp.
International Search Report issued in PCT/IB2021/052738; mailed on Jun. 25, 2021; 5 pp.
Stoermer Martin: 11 Homology Models of Wuhan Coronavirus 3CLpro Protease, • Feb. 5, 2020 (Feb. 5, 2020), pp. 1-11.
Written Opinion issued in PCT/IB2021/052738; mailed on Jun. 25, 2021; 6 pp.

* cited by examiner

*Primary Examiner* — Charanjit Aulakh
(74) *Attorney, Agent, or Firm* — John A. Wichtowski

(57) ABSTRACT

The invention relates to methods of treating COVID-19 in a patient by administering therapeutically effective amounts of certain SARS-CoV-2 inhibitor compounds or pharmaceutical compositions containing them to a patient in need thereof. The invention also relates to inhibiting SARS-CoV-2 coronavirus viral replication activity comprising contacting SARS-CoV-2-related coronavirus protease with a therapeutically effective amount of a SARS-Cov-2 protease inhibitor, such as a SARS-Cov-2 3CL protease inhibitor and compositions comprising the same.

21 Claims, 2 Drawing Sheets
Specification includes a Sequence Listing.

METHOD OF TREATING COVID-19

This application is a national stage application under 35 U.S.C. 371 of PCT/IB2021/052738, filed on Apr. 1, 2021, which claims the benefit of U.S. Provisional Patent Application No. 63/155,530, filed on Mar. 2, 2021, and U.S. Provisional Patent Application No. 63/005,376, filed on Apr. 5, 2020, the disclosures of which are hereby incorporated by reference in their entirety.

BACKGROUND OF THE INVENTION

The invention relates to methods of inhibiting viral replication activity comprising contacting a SARS-Cov-2-related 3C-like ("3CL") proteinase with a therapeutically effective amount of a SARS-Cov-2-related 3C-like protease inhibitor. The invention also relates to methods of treating Coronavirus Disease 2019 ("COVID-19") in a patient by administering a therapeutically effective amount of a SARS-Cov-2-related 3C-like protease inhibitor to a patient in need thereof. The invention further relates to methods of treating COVID-19 in a patient, the method comprising administering a pharmaceutical composition comprising a therapeutically effective amount of the SARS-Cov-2-related 3C-like protease inhibitor to a patient in need thereof.

A worldwide outbreak of Coronavirus Disease 2019 ("COVID-19") has been associated with exposures originating in late 2019 in Wuhan, Hubei Province, China. By early April 2020 the outbreak of COVID-19 had evolved into a global pandemic with approximately one million people having been confirmed as infected and resulting in approximately 50,000 deaths and by January 2021 approximately 100 million people had been infected globally with over 2 million deaths. The causative agent for COVID-19 has been identified as a novel coronavirus which has been named Severe Acute Respiratory Syndrome Corona Virus 2 ("SARS-CoV-2"). The genome sequence of SARS-CoV-2 has been sequenced from isolates obtained from nine patients in Wuhan, China and has been found to be of the subgenus Sarbecovirus of the genus Betacoronovirus. Lu, R. et al. The Lancet, Jan. 29, 2020; http://doi.org/10.1016/S0140-6736(20). The sequence of SARS-CoV-2 was found to have 88% homology with two bat-derived SARS-like coronaviruses, bat-SL-CoVZC45 and bat-SL-CoVZXC21 which were collected in 2018 in Zhoushan, eastern China. SARS-CoV-2 was also found to share about 79% homology with Severe Acute Respiratory Syndrome Corona Virus ("SARS-CoV"), the causative agent of the SARS outbreak in 2002-2003, and about 50% homology with Middle East Respiratory Syndrome Coronavirus ("MERS-CoV"), the causative agent of a respiratory viral outbreak originating in the Middle East in 2012. Based on a recent analysis of 103 sequenced genomes of SARS-CoV-2 it has been proposed that SARS-CoV-2 can be divided into two major types (L and S types) with the S type being ancestral and the L type having evolved from the S-type. Lu, J.; Cui, J. et al. On the origin and continuing evolution of SARS-CoV-2; http://doi.org/10.1093/nsr/nwaa036. The S and L types can be clearly defined by just two tightly linked SNPs at positions 8,782 (orf1ab:T8517C, synonymous) and 28,144 (ORF8: C251T, S84L). In the 103 genomes analyzed approximately 70% were of the L-type and approximately 30% were of the S-type. It is unclear if the evolution of the L-type from the S-type occurred in humans or through a zoonotic intermediate but it appears that the L-type is more aggressive than the S-type and human interference in attempting to contain the outbreak may have shifted the relative abundance of the L and S types soon after the SARS-CoV-2 outbreak began. The discovery of the proposed S- and L-subtypes of SARS-CoV-2 raises the possibility that an individual could potentially be infected sequentially with the individual subtypes or be infected with both subtypes at the same time. In view of this evolving threat there is an acute need in the art for an effective treatment for COVID-19 and for methods of inhibiting replication of the SARS-CoV-2 coronavirus.

Recent evidence clearly shows that the newly emerged coronavirus SARS-CoV-2, the causative agent of COVID-19 (Centers for Disease Control, CDC) has acquired the ability of human to human transmission leading to community spread of the virus. The sequence of the SARS-CoV-2 receptor binding domain ("RBD"), including its receptor-binding motif (RBM) that directly contacts the angiotensin 2 receptor, ACE2, is similar to the RBD and RBM of SARS-CoV, strongly suggesting that SARS-CoV-2 uses ACE2 as its receptor. Yushun Wan, Y.; Shang, J.; Graham, R.; 2, Baric, R. S.; Li, F.; Receptor recognition by novel coronavirus from Wuhan: An analysis based on decade-long structural studies of SARS; J. Virol. 2020; doi:10.1128/JVI.00127-20. Several critical residues in SARS-CoV-2 RBM (particularly $Gln^{493}$) provide favorable interactions with human ACE2, consistent with SARS-CoV-2's capacity for human cell infection. Several other critical residues in SARS-CoV-2's RBM (particularly $Asn^{501}$) are compatible with, but not ideal for, binding human ACE2, suggesting that SARS-CoV-2 uses ACE2 binding in some capacity for human-to-human transmission. More recent evidence indicates that a unique RRAR (Arginine-Arginine-Alanine-Arginine) sequence in the spike protein of SARS-CoV-2 acts as a furin cleavage site which enhances receptor affinity and leads to higher membrane fusion efficiency thereby resulting in higher transmissibility of SARS-CoV-2 when compared to all other subtype B beta-coronaviruses, none of which contain the RRAR sequence. Wu, C. et al. iScience 23, 101642, Oct. 23, 2020.

Coronavirus replication and transcription function is encoded by the so-called "replicase" gene (Ziebuhr, J., Snijder, E. J., and Gorbaleya, A. E.; Virus-encoded proteinases and proteolytic processing in Nidovirales. J. Gen. Virol. 2000, 81, 853-879; and Fehr, A. R.; Perlman, S.; Coronaviruses: An Overview of Their Replication and Pathogenesis Methods Mol Biol. 2015; 1282: 1-23. doi: 10.1007/978-1-4939-2438-7_1), which consists of two overlapping polyproteins that are extensively processed by viral proteases. The C-proximal region is processed at eleven conserved interdomain junctions by the coronavirus main or "3C-like" protease (Ziebuhr, Snijder, Gorbaleya, and Fehr, Perlman et al., 2015). The name "3C-like" protease derives from certain similarities between the coronavirus enzyme and the well-known picornavirus 3C proteases. These include substrate preferences, use of cysteine as an active site nucleophile in catalysis, and similarities in their putative overall polypeptide folds. The SARS-CoV-2 3CL protease sequence (Accession No. YP_009725301.1) has been found to share 96.08% homology when compared with the SARS-CoV 3CL protease (Accession No. YP_009725301.1) Xu, J.; Zhao, S.; Teng, T.; Abdalla, A. E.; Zhu, W.; Xie, L.; Wang, Y.; Guo, X.; Systematic Comparison of Two Animal-to-Human Transmitted Human Coronaviruses: SARS-CoV-2 and SARS-CoV; Viruses 2020, 12, 244; doi:10.3390/v12020244. Very recently Hilgenfeld and colleagues published a high-resolution X-ray structure of the SARS-CoV-2 coronavirus main protease (3CL) Zhang, L.; Lin, D.; Sun, X.; Rox, K.; Hilgenfeld, R.; X-ray Structure of Main Protease of the Novel Coronavirus SARS-CoV-2 Enables Design of α-Ketoamide Inhibitors; bioRxiv preprint doi: https://doi.org/10.1101/2020.02.17.952879. The structure indicates that there are differences when comparing the 3CL proteases of SARS-CoV-2 and SARS-CoV. In the SARS-CoV but not in the SARS-CoV-2 3CL protease dimer, there is a polar interaction between the two domains III involving a 2.60-Å hydrogen bond between the side-chain hydroxyl groups of residue Thr[285] of each protomer, and supported by a hydrophobic contact between the side-chain of Ile[286] and Thr[285] C72. In the SARS-CoV-2 3CL, the threonine is replaced by alanine, and the isoleucine by leucine when compared with the same residues in the SARS-CoV 3CL. The Thr285Ala replacement observed in the SARS-CoV-2 3CL protease allows the two domains III to approach each other somewhat closer (the distance between the Cα atoms of residues 285 in molecules A and B is 6.77 Å in SARS-CoV 3CL protease and 5.21 Å in SARS-CoV-2 3CL protease and the distance between the centers of mass of the two domains III shrinks from 33.4 Å to 32.1 Å). In the active site of SARS-CoV-2 3CL Cys[145] and His[41] form a catalytic dyad which when taken together with a with a buried water molecule that is hydrogen bonded to His[41] can be considered to constitute a catalytic triad of the SARS-CoV-2 3CL protease. In view of the ongoing SARS-CoV-2 spread which has caused the current worldwide COVID-19 outbreak it is desirable to have new methods of inhibiting SARS-CoV-2 viral replication and of treating COVID-19 in patients.

SUMMARY OF THE INVENTION

The following are embodiments of the present invention, referred to as E followed by a number, and are not to be construed in a limiting manner.

E1 is a method of treating COVID-19 in a patient, the method comprising administering to a patient in need thereof a therapeutically effective amount of a compound selected from the group consisting of: (3S)-3-({N-[(4-methoxy-1H-indol-2-yl)carbonyl]-L-leucyl}amino)-2-oxo-4-[(3S)-2-oxopyrrolidin-3-yl]butyl acetate; (3S)-3-({N-[(4-methoxy-1H-indol-2-yl)carbonyl]-L-leucyl}amino)-2-oxo-4-[(3S)-2-oxopyrrolidin-3-yl]butyl pivalate; (3S)-3-({N-[(4-methoxy-1H-indol-2-yl)carbonyl]-L-leucyl}amino)-2-oxo-4-[(3S)-2-oxopyrrolidin-3-yl]butyl benzoate; (3S)-3-({N-[(4-methoxy-1H-indol-2-yl)carbonyl]-L-leucyl}amino)-2-oxo-4-[(3S)-2-oxopyrrolidin-3-yl]butyl 4-methylbenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-fluorobenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-cyanobenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-methoxy benzoate; (3S)-3-({N-[(4-methoxy-1H-indol-2-yl)carbonyl]-L-leucyl}amino)-2-oxo-4-[(3S)-2-oxopyrrolidin-3-yl]butyl 4-chlorobenzoate; (3S)-3-({N-[(4-methoxy-1H-indol-2-yl)carbonyl]-L-leucyl}amino)-2-oxo-4-[(3S)-2-oxopyrrolidin-3-yl]butyl 2,6-dimethyl benzoate; (3S)-3-({N-[(4-methoxy-1H-Indol-2-yl)carbonyl]-L-leucyl}amino)-2-oxo-4-[(3S)-2-oxopyrrolidin-3-yl]butyl 2,6-difluorobenzoate; (3S)-3-({N-[(4-methoxy-1H-indol-2-yl)carbonyl]-L-leucyl}amino)-2-oxo-4-[(3S)-2-oxopyrrolidin-3-yl]butyl 2,6-dimethoxy benzoate; (3S)-3-({N-[(4-methoxy-1H-indol-2-yl)carbonyl]-L-leucyl}amino)-2-oxo-4-[(3S)-2-oxopyrrolidin-3-yl]butyl 4-chloro-2-hydroxybenzoate; (3S)-3-({N-[(4-methoxy-1H-indol-2-yl)carbonyl]-L-leucyl}amino)-2-oxo-4-[(3S)-2-oxopyrrolidin-3-yl]butyl 2,6-dichlorobenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-cyano-2-fluorobenzoate; and (3S)-3-({N-[(4-methoxy-1H-indol-2-yl)carbonyl]-L-leucyl}amino)-2-oxo-4-[(3S)-2-oxopyrrolidin-3-yl]butyl 2-cyanobenzoate; or a pharmaceutically acceptable salt thereof.

E2 is the method of E1 wherein the compound or pharmaceutically acceptable salt thereof is administered orally, by inhalation or intranasally. E3 is the method of E2 wherein the compound or pharmaceutically acceptable salt thereof is administered orally. E4 is the method of E2 wherein the compound or pharmaceutically acceptable salt thereof is administered intranasally. E5 is the method of E1 wherein the compound or pharmaceutically acceptable salt thereof is administered sublingually. E6 is the method of any one of E1 to E5 wherein the compound or pharmaceutically acceptable salt thereof is administered one to four times over a 24-hour period. E7 is the method of any one of E1 to E7 further comprising the administration of one or more additional therapeutic agents. E8 is the method of E7 wherein the additional therapeutic agent is selected from the group consisting of azithromycin and remdesivir.

E9 is a method of inhibiting or preventing SARS-CoV-2 viral replication comprising contacting a SARS-CoV-2 coronavirus protease with a therapeutically effective amount of a compound selected from the group consisting of: (3S)-3-({N-[(4-methoxy-1H-indol-2-yl)carbonyl]-L-leucyl}amino)-2-oxo-4-[(3S)-2-oxopyrrolidin-3-yl]butyl acetate; (3S)-3-({N-[(4-methoxy-1H-indol-2-yl)carbonyl]-L-leucyl}amino)-2-oxo-4-[(3S)-2-oxopyrrolidin-3-yl]butyl pivalate; (3S)-3-({N-[(4-methoxy-1H-indol-2-yl)carbonyl]-L-leucyl}amino)-2-oxo-4-[(3S)-2-oxopyrrolidin-3-yl]butyl benzoate; (3S)-3-({N-[(4-methoxy-1H-indol-2-yl)carbonyl]-L-leucyl}amino)-2-oxo-4-[(3S)-2-oxopyrrolidin-3-yl]butyl 4-methylbenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-fluorobenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-cyanobenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-methoxy benzoate; (3S)-3-({N-[(4-methoxy-1H-indol-2-yl)carbonyl]-L-leucyl}amino)-2-oxo-4-[(3S)-2-oxopyrrolidin-3-yl]butyl 4-chlorobenzoate; (3S)-3-({N-[(4-methoxy-1H-indol-2-yl)carbonyl]-L-leucyl}amino)-2-oxo-4-[(3S)-2-oxopyrrolidin-3-yl]butyl 2,6-dichlorobenzoate; (3S)-3-({N-[(4-methoxy-1H-indol-2-yl) carbonyl]-L-leucyl}amino)-2-oxo-4-[(3S)-2-oxopyrrolidin-3-yl]butyl 2,6-dimethyl benzoate; (3S)-3-({N-[(4-methoxy-1H-Indol-2-yl)carbonyl]-L-leucyl}amino)-2-oxo-4-[(3S)-2-oxopyrrolidin-3-yl]butyl 2,6-difluorobenzoate; (3S)-3-({N-[(4-methoxy-1H-indol-2-yl)carbonyl]-L-leucyl}amino)-2-oxo-4-[(3S)-2-oxopyrrolidin-3-yl]butyl 2,6-dimethoxy benzoate; (3S)-3-({N-[(4-methoxy-1H-indol-2-yl)carbonyl]-L-leucyl}amino)-2-oxo-4-[(3S)-2-oxopyrrolidin-3-yl]butyl 4-chloro-2-hydroxybenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-cyano-2-fluorobenzoate; and (3S)-3-({N-[(4-methoxy-1H-indol-2-yl)carbonyl]-L-leucyl}amino)-2-oxo-4-[(3S)-2-oxopyrrolidin-3-yl]butyl 2-cyanobenzoate; or a pharmaceutically acceptable salt thereof.

E10 is a method of inhibiting or preventing SARS-CoV-2 viral replication comprising contacting the SARS-CoV-2 coronavirus 3CL protease with a therapeutically effective amount of a compound selected from the group consisting of: (3S)-3-({N-[(4-methoxy-1H-indol-2-yl)carbonyl]-L-leucyl}amino)-2-oxo-4-[(3S)-2-oxopyrrolidin-3-yl]butyl acetate; (3S)-3-({N-[(4-methoxy-1H-indol-2-yl)carbonyl]-L-leucyl}amino)-2-oxo-4-[(3S)-2-oxopyrrolidin-3-yl]butyl pivalate; (3S)-3-({N-[(4-methoxy-1H-indol-2-yl)carbonyl]-L-leucyl}amino)-2-oxo-4-[(3S)-2-oxo pyrrolidin-3-yl]butyl benzoate; (3S)-3-({N-[(4-methoxy-1H-indol-2-yl)carbonyl]-L-leucyl}amino)-2-oxo-4-[(3S)-2-oxopyrrolidin-3-yl] butyl 4-methylbenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-fluorobenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-cyanobenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-methoxy benzoate; (3S)-3-({N-[(4-methoxy-1H-indol-2-yl)carbonyl]-L-leucyl}amino)-2-oxo-4-[(3S)-2-oxopyrrolidin-3-yl]butyl 4-chlorobenzoate; (3S)-3-({N-[(4-methoxy-1H-indol-2-yl)carbonyl]-L-leucyl}amino)-2-oxo-4-[(3S)-2-oxopyrrolidin-3-yl]butyl 2,6-dichlorobenzoate; (3S)-3-({N-[(4-methoxy-1H-indol-2-yl)carbonyl]-L-leucyl}amino)-2-oxo-4-[(3S)-2-oxopyrrolidin-3-yl]butyl 2,6-dimethylbenzoate; (3S)-3-({N-[(4-methoxy-1H-Indol-2-yl)carbonyl]-L-leucyl}amino)-2-oxo-4-[(3S)-2-oxopyrrolidin-3-yl]butyl 2,6-difluorobenzoate; (3S)-3-({N-[(4-methoxy-1H-indol-2-yl)carbonyl]-L-leucyl}amino)-2-oxo-4-[(3S)-2-oxopyrrolidin-3-yl]butyl 2,6-dimethoxybenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-chloro-2-hydroxybenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-cyano-2-fluorobenzoate; and (3S)-3-({N-[(4-methoxy-1H-indol-2-yl)carbonyl]-L-leucyl}amino)-2-oxo-4-[(3S)-2-oxopyrrolidin-3-yl]butyl 2-cyanobenzoate; or a pharmaceutically acceptable salt thereof.

E11 is a method of treating COVID-19 in a patient, the method comprising administering to a patient in need thereof a pharmaceutical composition, the pharmaceutical composition comprising a therapeutically effective amount of a compound selected from the group consisting of: (3S)-3-({N-[(4-methoxy-1H-indol-2-yl)carbonyl]-L-leucyl}amino)-2-oxo-4-[(3S)-2-oxopyrrolidin-3-yl]butyl acetate; (3S)-3-({N-[(4-methoxy-1H-indol-2-yl)carbonyl]-L-leucyl}amino)-2-oxo-4-[(3S)-2-oxopyrrolidin-3-yl]butyl pivalate; (3S)-3-({N-[(4-methoxy-1H-indol-2-yl)carbonyl]-L-leucyl}amino)-2-oxo-4-[(3S)-2-oxopyrrolidin-3-yl]butyl benzoate; (3S)-3-({N-[(4-methoxy-1H-indol-2-yl)carbonyl]-L-leucyl}amino)-2-oxo-4-[(3S)-2-oxopyrrolidin-3-yl] butyl 4-methylbenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-fluorobenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-cyanobenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-methoxy benzoate; (3S)-3-({N-[(4-methoxy-1H-indol-2-yl)carbonyl]-L-leucyl}amino)-2-oxo-4-[(3S)-2-oxopyrrolidin-3-yl]butyl 4-chlorobenzoate; (3S)-3-({N-[(4-methoxy-1H-indol-2-yl)carbonyl]-L-leucyl}amino)-2-oxo-4-[(3S)-2-oxopyrrolidin-3-yl]butyl 2,6-dichlorobenzoate; (3S)-3-({N-[(4-methoxy-1H-indol-2-yl)carbonyl]-L-leucyl}amino)-2-oxo-4-[(3S)-2-oxopyrrolidin-3-yl]butyl 2,6-dimethylbenzoate; (3S)-3-({N-[(4-methoxy-1H-Indol-2-yl)carbonyl]-L-leucyl}amino)-2-oxo-4-[(3S)-2-oxopyrrolidin-3-yl]butyl 2,6-difluorobenzoate; (3S)-3-({N-[(4-methoxy-1H-indol-2-yl)carbonyl]-L-leucyl}amino)-2-oxo-4-[(3S)-2-oxopyrrolidin-3-yl]butyl 2,6-dimethoxybenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-chloro-2-hydroxybenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-cyano-2-fluorobenzoate; and (3S)-3-({N-[(4-methoxy-1H-indol-2-yl)carbonyl]-L-leucyl}amino)-2-oxo-4-[(3S)-2-oxopyrrolidin-3-yl]butyl 2-cyanobenzoate; or a pharmaceutically acceptable salt thereof together with a pharmaceutically acceptable carrier. E12 is the method of E11 wherein the pharmaceutical composition further comprises one or more additional therapeutic agent. E13 is the method of E12 wherein the one or more additional therapeutic agent is selected from the group consisting of azithromycin and remdesivir. E14 is the method of any one of E11 to E13 wherein the pharmaceutical composition is administered orally. E15 is the method of any one of E11 to E13 wherein the pharmaceutical composition is administered by inhalation or intranasally.

E16 is a compound selected from the group consisting of: (3S)-3-({N-[(4-methoxy-1H-indol-2-yl)carbonyl]-L-leucyl}amino)-2-oxo-4-[(3S)-2-oxopyrrolidin-3-yl]butyl acetate; (3S)-3-({N-[(4-methoxy-1H-indol-2-yl)carbonyl]-L-leucyl}amino)-2-oxo-4-[(3S)-2-oxopyrrolidin-3-yl]butyl pivalate; (3S)-3-({N-[(4-methoxy-1H-indol-2-yl)carbonyl]-L-leucyl}amino)-2-oxo-4-[(3S)-2-oxopyrrolidin-3-yl]butyl benzoate; (3S)-3-({N-[(4-methoxy-1H-indol-2-yl)carbonyl]-L-leucyl}amino)-2-oxo-4-[(3S)-2-oxopyrrolidin-3-yl] butyl 4-methylbenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-fluorobenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-cyanobenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-methoxybenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-chlorobenzoate; (3S)-3-({N-[(4-methoxy-1H-indol-2-yl)carbonyl]-L-leucyl}amino)-2-oxo-4-[(3S)-2-oxopyrrolidin-3-yl]butyl 2,6-dichlorobenzoate; (3S)-3-({N-[(4-methoxy-1H-indol-2-yl)carbonyl]-L-leucyl}amino)-2-oxo-4-[(3S)-2-oxopyrrolidin-3-yl]butyl 2,6-dimethylbenzoate; (3S)-3-({N-[(4-methoxy-1H-Indol-2-yl)carbonyl]-L-leucyl}amino)-2-oxo-4-[(3S)-2-oxopyrrolidin-3-yl]butyl 2,6-difluorobenzoate; (3S)-3-({N-[(4-methoxy-1H-indol-2-yl)carbonyl]-L-leucyl}amino)-2-oxo-4-[(3S)-2-oxopyrrolidin-3-yl]butyl 2,6-dimethoxybenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-chloro-2-hydroxybenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-cyano-2-fluorobenzoate; and (3S)-3-({N-[(4-methoxy-1H-indol-2-yl)carbonyl]-L-leucyl}amino)-2-oxo-4-[(3S)-2-oxopyrrolidin-3-yl]butyl 2-cyanobenzoate; or a pharmaceutically acceptable salt thereof, for use in the treatment of COVID-19 in a patient.

E17 is a compound selected from the group consisting of: (3S)-3-({N-[(4-methoxy-1H-indol-2-yl)carbonyl]-L-leucyl}amino)-2-oxo-4-[(3S)-2-oxopyrrolidin-3-yl]butyl acetate; (3S)-3-({N-[(4-methoxy-1H-indol-2-yl)carbonyl]-L-leucyl}amino)-2-oxo-4-[(3S)-2-oxopyrrolidin-3-yl]butyl pivalate; (3S)-3-({N-[(4-methoxy-1H-indol-2-yl)carbonyl]-L-leucyl}amino)-2-oxo-4-[(3S)-2-oxopyrrolidin-3-yl]butyl benzoate; (3S)-3-({N-[(4-methoxy-1H-indol-2-yl) carbonyl]-L-leucyl}amino)-2-oxo-4-[(3S)-2-oxopyrrolidin-3-yl] butyl 4-methylbenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-fluorobenzoate; (3S)-3-({N-[(4-methoxy-1H-indol-2-yl)carbonyl]-L-leucyl}amino)-2-oxo- 4-[(3S)-2-oxopyrrolidin-3-yl]butyl 4-cyanobenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-methoxybenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-chlorobenzoate; (3S)-3-({N-[(4-methoxy-1H-indol-2-yl)carbonyl]-L-leucyl}amino)-2-oxo-4-[(3S)-2-oxopyrrolidin-3-yl]butyl 2,6-dichlorobenzoate; (3S)-3-({N-[(4-methoxy-1H-indol-2-yl)carbonyl]-L-leucyl}amino)-2-oxo-4-[(3S)-2-oxopyrrolidin-3-yl]butyl 2,6-dimethylbenzoate; (3S)-3-({N-[(4-methoxy-1H-Indol-2-yl)carbonyl]-L-leucyl}amino)-2-oxo-4-[(3S)-2-oxopyrrolidin-3-yl]butyl 2,6-difluorobenzoate; (3S)-3-({N-[(4-methoxy-1H-indol-2-yl)carbonyl]-L-leucyl}amino)-2-oxo-4-[(3S)-2-oxopyrrolidin-3-yl]butyl 2,6-dimethoxybenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-chloro-2-hydroxybenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-cyano-2-fluorobenzoate; and (3S)-3-({N-[(4-methoxy-1H-indol-2-yl)carbonyl]-L-leucyl}amino)-2-oxo-4-[(3S)-2-oxopyrrolidin-3-yl]butyl 2-cyanobenzoate; or a pharmaceutically acceptable salt thereof, for use in inhibiting or preventing SARS-CoV-viral replication.

E18 is the method of E7 or E12 wherein the one or more additional agent is selected from the group consisting of remdesivir, galidesivir, favilavir/avifavir, mulnupiravir (MK-4482/EIDD 2801), AT-527, AT-301, BLD-2660, favipiravir, camostat, SLV213 emtrictabine/tenofivir, clevudine, dalcetrapib, boceprevir, ABX464, dexamethasone, hydrocortisone, convalescent plasma, gelsolin (Rhu-p65N), monoclonal antibodies, regdanvimab (Regkirova), ravulizumab (Ultomiris), VIR-7831/VIR-7832, BRII-196/BRII-198, COVI-AMG/COVI DROPS (STI-2020), bamlanivimab (LY-CoV555), mavrilimab, leronlimab (PRO140), AZD7442, lenzilumab, infliximab, adalimumab, JS 016, STI-1499 (COVIGUARD), lanadelumab (Takhzyro), canakinumab (Ilaris), gimsilumab, otilimab, casirivimab/imdevimab (REGN-Cov2), MK-7110 (CD24Fc/SAC-COVID), heparin, apixaban, tocilizumab (Actemra), sarilumab (Kevzara), apilimod dimesylate, DNL758, PB1046, dapaglifozin, abivertinib, ATR-002, bemcentinib, acalabrutinib, baricitinib, losmapimod, famotidine, niclosamide and diminazene.

E19 is the method of E18 wherein the one or more additional agent is selected from the group consisting of remdesivir, dexamethasone, malnupiravir, bamlanivimab and baricitinib.

It is to be understood that the method of treatment embodiments of the invention can also to be construed as medical use-type embodiments (such as E16 above) or alternatively second medical use-type embodiments (such as E20 below).

E20 is a compound selected from the group consisting of: (3S)-3-({N-[(4-methoxy-1H-indol-2-yl)carbonyl]-L-leucyl}amino)-2-oxo-4-[(3S)-2-oxopyrrolidin-3-yl]butyl acetate; (3S)-3-({N-[(4-methoxy-1H-indol-2-yl)carbonyl]-L-leucyl}amino)-2-oxo-4-[(3S)-2-oxopyrrolidin-3-yl]butyl pivalate; (3S)-3-({N-[(4-methoxy-1H-indol-2-yl)carbonyl]-L-leucyl}amino)-2-oxo-4-[(3S)-2-oxopyrrolidin-3-yl]butyl benzoate; (3S)-3-({N-[(4-methoxy-1H-indol-2-yl) carbonyl]-L-leucyl}amino)-2-oxo-4-[(3S)-2-oxopyrrolidin-3-yl]butyl 4-methylbenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-fluorobenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-cyanobenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-methoxybenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-chlorobenzoate; (3S)-3-({N-[(4-methoxy-1H-indol-2-yl)carbonyl]-L-leucyl}amino)-2-oxo-4-[(3S)-2-oxopyrrolidin-3-yl]butyl 2,6-dichlorobenzoate; (3S)-3-({N-[(4-methoxy-1H-indol-2-yl)carbonyl]-L-leucyl}amino)-2-oxo-4-[(3S)-2-oxopyrrolidin-3-yl]butyl 2,6-dimethylbenzoate; (3S)-3-({N-[(4-methoxy-1H-Indol-2-yl)carbonyl]-L-leucyl}amino)-2-oxo-4-[(3S)-2-oxopyrrolidin-3-yl]butyl 2,6-difluorobenzoate; (3S)-3-({N-[(4-methoxy-1H-indol-2-yl)carbonyl]-L-leucyl}amino)-2-oxo-4-[(3S)-2-oxopyrrolidin-3-yl]butyl 2,6-dimethoxybenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-chloro-2-hydroxybenzoate; (3S)-3-({N-[(4-methoxy-1H-indol-2-yl)carbonyl]-L-leucyl}amino)-2-oxo-4-[(3S)-2-oxopyrrolidin-3-yl]butyl 4-cyano-2-fluorobenzoate; and (3S)-3-({N-[(4-methoxy-1H-indol-2-yl)carbonyl]-L-leucyl}amino)-2-oxo-4-[(3S)-2-oxopyrrolidin-3-yl]butyl 2-cyanobenzoate; or a pharmaceutically acceptable salt thereof, for use in the preparation of a medicament for the treatment of COVID-19 in a patient.

It is to be understood that for embodiments E9, E10, E11, E16, E17 and E20 additional dependent embodiments analogous to embodiments E2 to E8 and E18 and E19 (Which depend directly or indirectly from E1) can depend from each of E9, E10, E11, E16, E17 and E20 and are included in the present invention.

The present invention also provides a method of treating a condition that is mediated by SARS-CoV-2 coronavirus 3C-like protease activity in a patient by administering to said patient a pharmaceutically effective amount of a SARS-CoV-2 protease inhibitor as described herein.

The present invention also provides a method of targeting SARS-CoV-2 inhibition as a means of treating indications caused by SARS-CoV-2-related viral infections.

The present invention also provides a method of identifying cellular or viral pathways interfering with the functioning of the members of which could be used for treating indications caused by SARS-CoV-2 infections by administering a SARS-CoV-2 protease inhibitor as described herein.

The present invention also provides a method of using SARS-CoV-2 protease inhibitors as described herein as tools for understanding mechanism of action of other SARS-CoV-2 inhibitors.

The present invention also provides a method of using SARS-CoV-2 3C-like protease inhibitors for carrying out gene profiling experiments for monitoring the up or down regulation of genes for the purposed of identifying inhibitors for treating indications caused by SARS-CoV-2 infections such as COVID-19.

The present invention further provides a pharmaceutical composition for the treatment of COVID-19 in a mammal containing an amount of a SARS-CoV-2 3C-like protease inhibitor that is effective in treating COVID-19 and a pharmaceutically acceptable carrier.

DETAILED DESCRIPTION OF THE INVENTION

Figure 1:
FIG. 1 depicts the residue differences between SARS-CoV and SARS-CoV-2, with an inhibitor compound shown at the active site.

For the purposes of the present invention, as described and claimed herein, the following terms are defined as follows: As used herein, the terms "comprising" and "including" are used in their open, non-limiting sense. The term "treating", as used herein, unless otherwise indicated, means reversing, alleviating, inhibiting the progress of, or preventing the disorder of condition to which such term applies, or one or more symptoms of such disorder or condition. In the methods of treating COVID-19 it is to be understood that COVID-19 is the disease caused in patients by infection with the SARS-CoV-2 virus. The SARS-CoV-2 virus is to be understood to encompass the initially discovered strain of the virus as well as mutant strains which emerge, such as but not limited to, strains such as B.1.1.7 (UK variant), B.1.351 (South African variant) and P.1 (Brazilian variant). The term "treatment", as used herein, unless otherwise indicated, refers to the act of treating as "treating" is defined immediately above.

The phrase "pharmaceutically acceptable salts(s)", as used herein, unless otherwise indicated, includes salts of acidic or basic groups which may be present in the compounds described herein. The compounds used in the methods of the invention that are basic in nature are capable of forming a wide variety of salts with various inorganic and organic acids. The acids that may be used to prepare pharmaceutically acceptable acid addition salts of such basic compounds are those that form non-toxic acid addition salts, i.e., salts containing pharmacologically acceptable anions, such as the acetate, benzenesulfonate, benzoate, bicarbonate, bisulfate, bitartrate, borate, bromide, calcium edetate, camsylate, carbonate, chloride, clavulanate, citrate, dihydrochloride, edetate, edislyate, estolate, esylate, ethylsuccinate, fumarate, gluceptate, gluconate, glutamate, glycollylarsanilate, hexylresorcinate, hydrabamine, hydrobromide, hydrochloride, iodide, isethionate, lactate, lactobionate, laurate, malate, maleate, mandelate, mesylate, methylsulfate, mucate, napsylate, nitrate, oleate, oxalate, pamoate (embonate), palmitate, pantothenate, phosphate/diphosphate, polygalacturonate, salicylate, stearate, subacetate, succinate, tannate, tartrate, teoclate, tosylate, triethiodode, and valerate salts.

With respect to the compounds used in the methods of the invention, if the compounds also exist as tautomeric forms then this invention relates to the use of all such tautomers and mixtures thereof.

The subject invention also includes methods of treatment of COVID-19 and methods of inhibiting SARS-CoV-2 with isotopically-labelled compounds, which are identical to those recited herein, but for the fact that one or more atoms are replaced by an atom having an atomic mass or mass number different from the atomic mass or mass number usually found in nature. Examples of isotopes that can be incorporated into compounds of the invention include isotopes of hydrogen, carbon, nitrogen, oxygen, phosphorous, fluorine and chlorine, such as $^{2}$H, $^{3}$H, $^{13}$C $^{14}$C, $^{15}$N, $^{18}$O, $^{17}$O, $^{31}$P, $^{32}$P, $^{35}$S, $^{18}$F, and $^{36}$Cl, respectively. Compounds of the present invention, prodrugs thereof, and pharmaceutically acceptable salts of said compounds or of said prodrugs which contain the aforementioned isotopes and/or isotopes of other atoms are with the scope of this invention. Certain isotopically-labelled compounds of the present invention, for example those into which radioactive isotopes such as $^{3}$H and $^{14}$C are incorporated, are useful in drug and/or substrate tissue distribution assays. Tritiated, i.e., $^{3}$H, and carbon-14, i.e., $^{14}$C, isotopes are particularly preferred for their ease of preparation and detectability. Further, substitution with heavier isotopes such as deuterium, i.e., $^{2}$H, can afford certain therapeutic advantages resulting from greater metabolic stability, for example increased in vivo half-life or reduced dosage requirements and, hence, may be preferred in some circumstances. Isotopically labelled compounds used in the methods of this invention and prodrugs thereof can generally be prepared by carrying out the procedures for preparing the compounds disclosed in the art by substituting a readily available isotopically labelled reagent for a non-isotopically labelled reagent.

This invention also encompasses methods using pharmaceutical compositions and methods of treating COVID-19 infections through administering prodrugs of compounds of the invention. Compounds having free amido or hydroxy groups can be converted into prodrugs. Prodrugs include compounds wherein an amino acid residue, or a polypeptide chain of two or more (e.g., two, three or four) amino acid residues is covalently joined through an ester bond to a hydroxy of compounds used in the methods of this invention. The amino acid residues include but are not limited to the 20 naturally occurring amino acids commonly designated by three letter symbols and also includes 4-hydroxyproline, hydroxylysine, demosine, isodemosine, 3-methylhistidine, norvalin, beta-alanine, gamma-aminobutyric acid, citrulline homocysteine, homoserine, ornithine and methionine sulfone. Additional types of prodrugs are also encompassed. For instance, free hydroxy groups may be derivatized using groups including but not limited to hemisuccinates, phosphate esters, dimethylaminoacetates, and phosphoryloxymethyloxycarbonyls, as outlined in *Advanced Drug Delivery Reviews*, 1996, 19, 115. Carbamate prodrugs of hydroxy and amino groups are also included, as are carbonate prodrugs, sulfonate esters and sulfate esters of hydroxy groups. Derivatization of hydroxy groups as (acyloxy)methyl and (acyloxy)ethyl ethers wherein the acyl group may be an alkyl ester, optionally substituted with groups including but not limited to ether, amine and carboxylic acid functionalities, or where the acyl group is an amino acid ester as described above, are also encompassed. Prodrugs of this type are described in *J. Med. Chem.*, 1996, 29, 10. Free amines can also be derivatized as amides, sulfonamides or phosphonamides. All of these prodrug moieties may incorporate groups including but not limited to ether, amine and carboxylic acid functionalities.

The compounds used in the methods of the invention can also be used in combination with other drugs. For example, dosing a SARS-CoV-2 coronavirus infected patient (i.e. a patient with COVID-19) with the SARS-CoV-2 coronavirus 3CL protease inhibitor of the invention and an interferon, such as interferon alpha, or a pegylated interferon, such as PEG-Intron or Pegasus, may provide a greater clinical benefit than dosing either the interferon, pegylated interferon or the SARS-CoV-2 coronavirus inhibitor alone. Other additional agents that can be used in the methods of the present invention include chloroquine, hydroxychloroquine, azithromycin and remdesivir. Examples of greater clinical benefits could include a larger reduction in COVID-19 symptoms, a faster time to alleviation of symptoms, reduced lung pathology, a larger reduction in the amount of SARS-Cov-2 coronavirus in the patient (viral load), and decreased mortality.

The SARS-Cov-2 coronavirus infects cells which express p-glycoprotein. Some of the SARS-Cov-2 coronavirus 3CL protease inhibitors of the invention are p-glycoprotein substrates. Compounds which inhibit the SARS-Cov-2 coronavirus which are also p-glycoprotein substrates may be dosed with p-glycoprotein inhibitor. Examples of p-glycoprotein inhibitors are verapamil, vinblastine, ketoconazole, nelfinavir, ritonavir or cyclosporine. The p-glycoprotein inhibitors act by inhibiting the efflux of the SARS-Cov-2 coronavirus inhibitors of the invention out of the cell. The inhibition of the p-glycoprotein based efflux will prevent reduction of intracellular concentrations of the SARS-Cov-2 coronavirus inhibitor due to p-glycoprotein efflux. Inhibition of the p-glycoprotein efflux will result in larger intracellular concentrations of the SARS-CoV-2 coronavirus inhibitors. Dosing a SARS-CoV-2 coronavirus infected patient with the SARS-CoV-2 coronavirus 3CL protease inhibitors of the invention and a p-glycoprotein inhibitor may lower the amount of SARS-Cov-2 coronavirus 3CL protease inhibitor required to achieve an efficacious dose by increasing the intracellular concentration of the SARS-CoV-2 coronavirus 3CL protease inhibitor.

Among the agents that may be used to increase the exposure of a mammal to a compound of the present invention are those that can as inhibitors of at least one isoform of the cytochrome P450 (CYP450) enzymes. The isoforms of CYP450 that may be beneficially inhibited included, but are not limited to CYP1A2, CYP2D6, CYP2C9, CYP2C19 and CYP3A4. The compounds used in the methods of the invention include compounds that may be CYP3A4 substrates and are metabolized by CYP3A4. Dosing a SARS-CoV-2 coronavirus infected patient with a SARS-CoV-2 coronavirus inhibitor which is a CYP3A4 substrate, such as SARS-CoV-2 coronavirus 3CL protease inhibitor, and a CYP3A4 inhibitor, such as ritonavir, nelfinavir or delavirdine, will reduce the metabolism of the SARS-Cov-2 coronavirus inhibitor by CYP3A4. This will result in reduced clearance of the SARS-CoV-2 coronavirus inhibitor and increased SARS-Cov-2 coronavirus inhibitor plasma concentrations. The reduced clearance and higher plasma concentrations may result in a lower efficacious dose of the SARS-CoV-2 coronavirus inhibitor.

Additional therapeutic agents that can be used in combination with the SARS-CoV-2 inhibitors in the methods of the present invention include the following:

PLpro inhibitors: Ribavirin, Valganciclovir, β-Thymidine, Aspartame, Oxprenolol, Doxycycline, Acetophenazine, Iopromide, Riboflavin, Reproterol, 2,2'-Cyclocytidine, Chloramphenicol, Chlorphenesin carbamate, Levodropropizine, Cefamandole, Floxuridine, Tigecycline, Pemetrexed, L(+)-Ascorbic acid, Glutathione, Hesperetin, Ademetionine, Masoprocol, Isotretinoin, Dantrolene, Sulfasalazine Anti-bacterial, Silybin, Nicardipine, Sildenafil, Platycodin, Chrysin, Neohesperidin, Baicalin, Sugetriol-3,9-diacetate, (−)-Epigallocatechin gallate, Phaitanthrin D, 2-(3,4-Dihydroxyphenyl)-2-[[2-(3,4-dihydroxyphenyl)-3,4-dihydro-5, 7-dihydroxy-2H-1-benzopyran-3-yl]oxy]-3,4-dihydro-2H-1-benzopyran-3,4,5,7-tetrol, 2,2-Di(3-indolyl)-3-indolone, (S)-(1S,2R,4aS,5R,8aS)-1-Formamido-1,4a-dimethyl-6-methylene-5-((E)-2-(2-oxo-2,5-dihydrofuran-3-yl)ethenyl)decahydronaphthalen-2-yl-2-amino-3-phenylpropanoate, Piceatannol, Rosmarinic acid, and Magnolol.

3CLpro inhibitors: Lymecycline, Chlorhexidine, Alfuzosin, Cilastatin, Famotidine, Almitrine, Progabide, Nepafenac, Carvedilol, Amprenavir, Tigecycline, Montelukast, Carminic acid, Mimosine, Flavin, Lutein, Cefpiramide, Phenethicillin, Candoxatril, Nicardipine, Estradiol valerate, Pioglitazone, Conivaptan, Telmisartan, Doxycycline, Oxytetracycline, (1S,2R,4aS,5R,8aS)-1-Formamido-1,4a-dimethyl-6-methylene-5-((E)-2-(2-oxo-2,5-dihydrofuran-3-yl)ethenyl)decahydronaphthalen-2-yl5-((R)-1,2-dithiolan-3-yl) pentanoate, Betulonal, Chrysin-7-O-β-glucuronide, Andrographiside, (1S,2R,4aS,5R,8aS)-1-Formamido-1,4a-dimethyl-6-methylene-5-((E)-2-(2-oxo-2,5-dihydrofuran-3-yl)ethenyl)decahydronaphthalen-2-yl 2-nitrobenzoate, 2β-Hydroxy-3,4-seco-friedelolactone-27-oic acid (S)-(1S, 2R,4aS,5R,8aS)-1-Formamido-1,4a-dimethyl-6-methylene-5-((E)-2-(2-oxo-2,5-dihydrofuran-3-yl)ethenyl) decahydronaphthalen-2-yl-2-amino-3-phenylpropanoate, Isodecortinol, Cerevisterol, Hesperidin, Neohesperidin, Andrograpanin, 2-((1R,5R,6R,8aS)-6-Hydroxy-5-(hydroxymethyl)-5,8a-dimethyl-2-methylenedecahydronaphthalen-1-yl)ethyl benzoate, Cosmosiin, Cleistocaltone A, 2,2-Di(3-indolyl)-3-indolone, Biorobin, Gnidicin, Phyllaemblinol, Theaflavin 3,3'-di-O-gallate, Rosmarinic acid, Kouitchenside I, Oleanolic acid, Stigmast-5-en-3-ol, Deacetylcentapicrin, and Berchemol.

RdRp inhibitors: Valganciclovir, Chlorhexidine, Ceftibuten, Fenoterol, Fludarabine, Itraconazole, Cefuroxime, Atovaquone, Chenodeoxycholic acid, Cromolyn, Pancuronium bromide, Cortisone, Tibolone, Novobiocin, Silybin, Idarubicin Bromocriptine, Diphenoxylate, Benzylpenicilloyl G, Dabigatran etexilate, Betulonal, Gnidicin, 2,6,30,6-Dihydroxy-3,4-seco-friedelolactone-27-lactone, 14-Deoxy-11,12-didehydroandrographolide, Gniditrin, Theaflavin 3,3'-di-O-gallate, (R)-((1R,5aS,6R,9aS)-1,5a-Dimethyl-7-methylene-3-oxo-6-((E)-2-(2-oxo-2,5-dihydrofuran-3-yl) ethenyl)decahydro-1H-benzo[c]azepin-1-yl)methyl2-amino-3-phenylpropanoate, 2β-Hydroxy-3,4-seco-friedelolactone-27-oic acid, 2-(3,4-Dihydroxyphenyl)-2-[[2-(3,4-dihydroxyphenyl)-3,4-dihydro-5,7-dihydroxy-2H-1-benzopyran-3-yl]oxy]-3,4-dihydro-2H-1-benzopyran-3,4,5, 7-tetrol, Phyllaemblicin B, 14-hydroxycyperotundone, Andrographiside, 2-((1R,5R,6R,8aS)-6-Hydroxy-5-(hydroxymethyl)-5,8a-dimethyl-2-methylenedecahydro naphthalen-1-yl)ethyl benzoate, Andrographolide, Sugetriol-3,9-diacetate, Baicalin, (1S,2R,4aS,5R,8aS)-1-Formamido-1, 4a-dimethyl-6-methylene-5-((E)-2-(2-oxo-2,5-dihydrofuran-3-yl)ethenyl)decahydronaphthalen-2-yl 5-((R)-1,2-dithiolan-3-yl)pentanoate, 1,7-Dihydroxy-3-methoxyxanthone, 1,2,6-Trimethoxy-8-[(6-O-β-D-xylopyranosyl-β-D-glucopyranosyl)oxy]-9H-xanthen-9-one, and 1,8-Dihydroxy-6-methoxy-2-[(6-O-β-D-xylopyranosyl-β-D-glucopyranosyl)oxy]-9H-xanthen-9-one, 8-(β-D-Glucopyranosyloxy)-1,3,5-trihydroxy-9H-xanthen-9-one, Additional therapeutic agents that can be used in the methods of the invention include Diosmin, Hesperidin, MK-3207, Venetoclax, Dihydroergocristine, Bolazine, R428, Ditercalinium, Etoposide, Teniposide, UK-432097, Irinotecan, Lumacaftor, Velpatasvir, Eluxadoline, Ledipasvir, Lopinavir/Ritonavir+Ribavirin, Alferon, and prednisone. Other additional agents useful in the methods of the present invention include chloroquine, hydroxychloroquine, azithromycin and remdisivir.

Other additional agents that can be used in the methods of the present invention include α-ketoamides compounds designated as 11r, 13a and 13b, shown below, as described in Zhang, L.; Lin, D.; Sun, X.; Rox, K.; Hilgenfeld, R.; X-ray Structure of Main Protease of the Novel Coronavirus SARS-CoV-2 Enables Design of α-Ketoamide Inhibitors; bioRxiv preprint doi: https://doi.org/10.1101/2020.02.17.952879

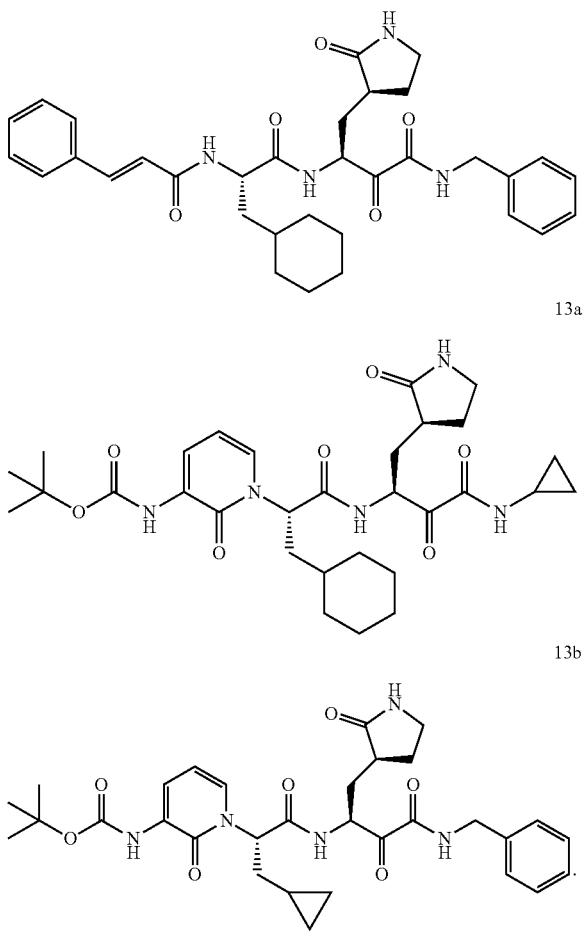

Additional agents that can be used in the methods of the present invention include RIG 1 pathway activators such as those described in U.S. Pat. No. 9,884,876.

Another embodiment of the present invention is a method of treating COVID-19 in a patient wherein an additional agent is administered and the additional agent is selected from antivirals such as remdesivir, galidesivir, favilavir/avifavir, mulnupiravir (MK-4482/EIDD 2801), AT-527, AT-301, BLD-2660, favipiravir, camostat, SLV213 emtrictabine/tenofivir, clevudine, dalcetrapib, boceprevir and ABX464, glucocorticoids such as dexamethasone and hydrocortisone, convalescent plasma, a recombinant human plasma such as gelsolin (Rhu-p65N), monoclonal antibodies such as regdanvimab (Regkirova), ravulizumab (Ultomiris), VIR-7831/VIR-7832, BRII-196/BRII-198, COVI-AMG/COVI DROPS (STI-2020), bamlanivimab (LY-CoV555), mavrilimab, leronlimab (PRO140), AZD7442, lenzilumab, infliximab, adalimumab, JS 016, STI-1499 (COVIGUARD), lanadelumab (Takhzyro), canakinumab (Ilaris), gimsilumab and otilimab, antibody cocktails such as casirivimab/imdevimab (REGN-Cov2), recombinant fusion protein such as MK-7110 (CD24Fc/SACCOVID), anticoagulants such as heparin and apixaban, IL-6 receptor agonists such as tocilizumab (Actemra) and sarilumab (Kevzara), PIKfyve inhibitors such as apilimod dimesylate, RIPK1 inhibitors such as DNL758, VIP receptor agonists such as PB1046, SGLT2 inhibitors such as dapaglifozin, TYK inhibitors such as abivertinib, kinase inhibitors such as ATR-002, bemcentinib, acalabrutinib, baricitinib and losmapimod, H2 blockers such as famotidine, anthelmintics such as niclosamide, furin inhibitors such as diminazene.

The term "SARS-Cov-2 inhibiting agent" means any SARS-CoV-2 related coronavirus 3C like protease inhibitor compound described herein or a pharmaceutically acceptable salt, hydrate, prodrug, active metabolite or solvate thereof or a compound which inhibits replication of SARS-CoV-2 in any manner.

The term "interfering with or preventing" SARS-CoV-2-related coronavirus ("SARS-CoV-2") viral replication in a cell means to reduce SARS-CoV-2 replication or production of SARS-CoV-2 components necessary for progeny virus in a cell as compared to a cell not being transiently or stably transduced with the ribozyme or a vector encoding the ribozyme. Simple and convenient assays to determine if SARS-CoV-2 viral replication has been reduced include an ELISA assay for the presence, absence, or reduced presence of anti-SARS-CoV-2 antibodies in the blood of the subject (Nasoff, et al., PNAS 88:5462-5466, 1991), RT-PCR (Yu, et al., in Viral Hepatitis and Liver Disease 574-577, Nishioka, Suzuki and Mishiro (Eds.); Springer-Verlag, Tokyo, 1994). Such methods are well known to those of ordinary skill in the art. Alternatively, total RNA from transduced and infected "control" cells can be isolated and subjected to analysis by dot blot or northern blot and probed with SARS-CoV-2 specific DNA to determine if SARS-CoV-2 replication is reduced. Alternatively, reduction of SARS-CoV-2 protein expression can also be used as an indicator of inhibition of SARS-CoV-2 replication. A greater than fifty percent reduction in SARS-CoV-2 replication as compared to control cells typically quantitates a prevention of SARS-CoV-2 replication.

If an SARS-CoV-2 inhibitor compound used in the method of the invention is a base, a desired salt may be prepared by any suitable method known to the art, including treatment of the free base with an inorganic acid (such as hydrochloric acid, hydrobromic acid, sulfuric acid, nitric acid, phosphoric acid, and the like), or with an organic acid (such as acetic acid, maleic acid, succinic acid, mandelic acid, fumaric acid, malonic acid, pyruvic acid, oxalic acid, glycolic acid, salicylic acid, pyranosidyl acid (such as glucuronic acid or galacturonic acid), alpha-hydroxy acid (such as citric acid or tartaric acid), amino acid (such as aspartic acid or glutamic acid), aromatic acid (such as benzoic acid or cinnamic acid), sulfonic acid (such as p-toluenesulfonic acid or ethanesulfonic acid), and the like.

If an SARS-CoV-2 inhibitor compound used in the method of the invention is an acid, a desired salt may be prepared by any suitable method known to the art, including treatment of the free acid with an inorganic or organic base (such as an amine (primary, secondary, or tertiary)), an alkali metal hydroxide, or alkaline earth metal hydroxide. Illustrative examples of suitable salts include organic salts derived from amino acids (such as glycine and arginine), ammonia, primary amines, secondary amines, tertiary amines, and cyclic amines (such as piperidine, morpholine, and piperazine), as well as inorganic salts derived from sodium, calcium, potassium, magnesium, manganese, iron, copper, zinc, aluminum and lithium.

In the case of SARS-CoV-2 inhibitor compounds, prodrugs, salts, or solvates that are solids, it is understood by those skilled in the art that the hydroxamate compound, prodrugs, salts, and solvates used in the method of the invention, may exist in different polymorph or crystal forms, all of which are intended to be within the scope of the present invention and specified formulas. In addition, the hydroxamate compound, salts, prodrugs and solvates used in the method of the invention may exist as tautomers, all of which are intended to be within the broad scope of the present invention.

Solubilizing agents may also be used with the compounds of the invention to increase the compounds solubility in water of physiologically acceptable solutions. These solubilizing agents include cyclodextrans, propylene glycol, diethylacetamide, polyethylene glycol, Tween, ethanol and micelle forming agents. Offered solubilizing agents are cyclodextrans, particularly beta cyclodextrans and in particular hydroxypropyl betacyclodextran and sulfobutylether betacyclodextran.

In some cases, the SARS-CoV-2 inhibitor compounds, salts, prodrugs and solvates used in the method of the invention may have chiral centers. When chiral centers are present, the hydroxamate compound, salts, prodrugs and solvates may exist as single stereoisomers, racemates, and/or mixtures of enantiomers and/or disastereomers. All such single stereoisomers, racemates, and mixtures thereof are intended to be within the broad scope of the present invention.

As generally understood by those skilled in the art, an optically pure compound is one that is enantiomerically pure. As used herein, the term "optically pure" is intended to mean a compound comprising at least a sufficient activity. Preferably, an optically pure amount of a single enantiomer to yield a compound having the desired pharmacological pure compound of the invention comprised at least 90% of a single isomer (80% enantiomeric excess), more preferably at least 95% (90% e.e.), even more preferably at least 97.5% (95%) e.e.), and most preferably at least 99% (98% e.e.).

The term "treating", as used herein, unless otherwise indicated, means reversing, alleviating, inhibiting the progress of, or preventing the disorder or condition to which such term applies, or one or more symptoms of such disorder or condition. The term "treatment", as used herein, unless otherwise indicated, refers to the act of treating as "treating" is defined immediately above. In a preferred embodiment of the present invention, "treating" or "treatment" means at least the mitigation of a disease condition in a human, that is alleviated by the inhibition of the activity of the SARS-CoV-2 3C-like protease which is the main protease of SARS-CoV-2, the causative agent for COVID-19. For patients suffering from COVID-19 fever, fatigue, and dry cough are the main manifestations of the disease, while nasal congestion, runny nose, and other symptoms of the upper respiratory tract are rare. Beijing Centers for Diseases Control and Prevention indicated that the typical case of COVID-19 has a progressive aggravation process. COVID-19 can be classified into light, normal, severe, and critical types based on the severity of the disease National Health Commission of the People's Republic of China. Diagnosis and Treatment of Pneumonia Caused by 2019-nCoV (Trial Version 4). Available online: http://www.nhc.gov.cn/jkj/s3577/202002/573340613ab243b3a7f61df260551dd4/files/c7 91e5a7ea5149f680fdcb34dac0f54e.pdf (accessed on 6 Feb. 2020).: (1) Mild cases—the clinical symptoms were mild, and no pneumonia was found on the chest computed tomography (CT); (2) normal cases—fever, respiratory symptoms, and patients found to have imaging manifestations of pneumonia; (3) severe cases—one of the following three conditions: Respiratory distress, respiratory rate ≥30 times/min (in resting state, refers to oxygen saturation ≤93%), partial arterial oxygen pressure (PaO2)/oxygen absorption concentration (FiO2)≤300 mmHg (1 mmHg=0.133 kPa); (4) critical cases—one of the following three conditions: Respiratory failure and the need for mechanical ventilation, shock, or the associated failure of other organs requiring the intensive care unit. The current clinical data shows that the majority of the deaths occurred in the older patients. However, severe cases have been documented in young adults who have unique factors, particularly those with chronic diseases, such as diabetes or hepatitis B. Those with a long-term use of hormones or immunosuppressants, and decreased immune function, are likely to get severely infected.

Methods of treatment for mitigation of a disease condition such as COVID-19 include the use of one or more of the compounds in the invention in any conventionally acceptable manner. According to certain preferred embodiments of the invention, the compound or compounds used in the methods of the present invention are administered to a mammal, such as a human, in need thereof. Preferably, the mammal in need thereof is infected with a coronavirus such as the causative agent of COVID-19, namely SARS-CoV-2.

The present invention also includes prophylactic methods, comprising administering an effective amount of a SARS-CoV-2 inhibitor of the invention, or a pharmaceutically acceptable salt, prodrug, pharmaceutically active metabolite, or solvate thereof to a mammal, such as a human at risk for infection by SARS-CoV-2. According to certain preferred embodiments, an effective amount of one or more compounds of the invention, or a pharmaceutically acceptable salt, prodrug, pharmaceutically active metabolite, or solvate thereof is administered to a human at risk for infection by SARS-CoV-2, the causative agent for COVID-19. The prophylactic methods of the invention include the use of one or more of the compounds in the invention in any conventionally acceptable manner.

The following are examples of specific embodiments of the invention:

Certain of the compounds used in the methods of the invention are known and can be made by methods known in the art.

Recent evidence indicates that a new coronavirus SARS-Cov-2 is the causative agent of COVID-19. The nucleotide sequence of the SARS-CoV-2 coronavirus as well as the recently determined L- and S-subtypes have recently been determined and made publicly available.

The activity of the inhibitor compounds as inhibitors of SARS-CoV-2 viral activity may be measured by any of the suitable methods available in the art, including in vivo and in vitro assays. The activity of the compounds of the present invention as inhibitors of coronavirus 3C-like protease activity (such as the 3C-like protease of the SARS-CoV-coronavirus) may be measured by any of the suitable methods known to those skilled in the art, including in vivo and in vitro assays. Examples of suitable assays for activity measurements include the antiviral cell culture assays described herein as well as the antiprotease assays described herein, such as the assays described in the Example section.

Administration of the SARS-CoV-2 inhibitor compounds and their pharmaceutically acceptable prodrugs, salts, active metabolites, and solvates may be performed according to any of the accepted modes of administration available to those skilled in the art. Illustrative examples of suitable modes of administration include oral, nasal, pulmonary, by inhalation, parenteral, topical, intravenous, injected, transdermal, and rectal. Oral, intravenous, by inhalation and nasal deliveries are preferred.

A SARS-CoV-2-inhibiting agent may be administered as a pharmaceutical composition in any suitable pharmaceutical form. Suitable pharmaceutical forms include solid, semisolid, liquid, or lyophilized formulations, such as tablets, powders, capsules, suppositories, suspensions, liposomes, and aerosols. The SARS-CoV-2-inhibiting agent may be prepared as a solution using any of a variety of methodologies. For example, SARS-CoV-2-inhibiting agent can be dissolved with acid (e.g., 1 M HCl) and diluted with a sufficient volume of a solution of 5% dextrose in water (D5W) to yield the desired final concentration of SARS-Cov-2-inhibiting agent (e.g., about 15 mM). Alternatively, a solution of D5W containing about 15 mM HCl can be used to provide a solution of the SARS-CoV-2-inhibiting agent at the appropriate concentration. Further, the SARS-Cov-2-inhibiting agent can be prepared as a suspension using, for example, a 1% solution of carboxymethylcellulose (CMC).

Acceptable methods of preparing suitable pharmaceutical forms of the pharmaceutical compositions are known or may be routinely determined by those skilled in the art. For example, pharmaceutical preparations may be prepared following conventional techniques of the pharmaceutical chemist involving steps such as mixing, granulating, and compressing when necessary for tablet forms, or mixing, filling and dissolving the ingredients as appropriate, to give the desired products for intravenous, oral, parenteral, topical, intravaginal, intranasal, intrabronchial, intraocular, intraaural, and/or rectal administration.

Pharmaceutical compositions of the invention may also include suitable excipients, diluents, vehicles, and carriers, as well as other pharmaceutically active agents, depending upon the intended use. Solid or liquid pharmaceutically acceptable carriers, diluents, vehicles, or excipients may be employed in the pharmaceutical compositions. Illustrative solid carriers include starch, lactose, calcium sulfate dihydrate, terra alba, sucrose, talc, gelatin, pectin, acacia, magnesium stearate, and stearic acid. Illustrative liquid carriers include syrup, peanut oil, olive oil, saline solution, and water. The carrier or diluent may include a suitable prolonged-release material, such as glyceryl monostearate or glyceryl distearate, alone or with a wax. When a liquid carrier is used, the preparation may be in the form of a syrup, elixir, emulsion, soft gelatin capsule, sterile injectable liquid (e.g., solution), or a nonaqueous or aqueous liquid suspension.

A dose of the pharmaceutical composition may contain at least a therapeutically effective amount of a SARS-CoV-2-inhibiting agent and preferably is made up of one or more pharmaceutical dosage units. The selected dose may be administered to a mammal, for example, a human patient, in need of treatment mediated by inhibition of SARS-Cov-2 related coronavirus activity, by any known or suitable method of administering the dose, including topically, for example, as an ointment or cream; orally; rectally, for example, as a suppository; parenterally by injection; intravenously; or continuously by intravaginal, intranasal, intrabronchial, intraaural, or intraocular infusion.

The phrases "therapeutically effective amount" and "effective amount" are intended to mean the amount of an inventive agent that, when administered to a mammal in need of treatment, is sufficient to effect treatment for injury or disease conditions alleviated by the inhibition of SARS-CoV-2 viral replication. The amount of a given SARS-CoV-2-inhibiting agent used in the method of the invention that will be therapeutically effective will vary depending upon factors such as the particular SARS-CoV-2-inhibiting agent, the disease condition and the severity thereof, the identity and characteristics of the mammal in need thereof, which amount may be routinely determined by those skilled in the art.

It will be appreciated that the actual dosages of the SARS-CoV-2-inhibiting agents used in the pharmaceutical compositions of this invention will be selected according to the properties of the particular agent being used, the particular composition formulated, the mode of administration and the particular site, and the host and condition being treated. Optimal dosages for a given set of conditions can be ascertained by those skilled in the art using conventional dosage-determination tests. For oral administration, e.g., a dose that may be employed is from about 0.01 to about 1000 mg/kg body weight, preferably from about 0.1 to about 500 mg/kg body weight, and even more preferably from about 1 to about 500 mg/kg body weight, with courses of treatment repeated at appropriate intervals. The compounds employed in the methods of the invention can be administered orally in known oral dosage forms such as tablets, capsules or oral suspensions. The oral administration of the compounds to the patient can occur one, two, three or four times a day with each dose containing 10 mg, 25 mg, 50 mg, 100 mg, 200 mg, 300 mg, 400 mg, 500 mg, 600 mg, 700 mg, 800 mg, 900 mg or 1000 mg. For intravenous dosing a dose of up to 5 grams per day of the compound may be employed. Intravenous administration can occur for intermittent periods during a day or continuously over a 24-hour period.

The terms "cytochrome P450-inhibiting amount" and "cytochrome P450 enzyme activity-inhibiting amount", as used herein, refer to an amount of a compound required to decrease the activity of cytochrome P450 enzymes or a particular cytochrome P450 enzyme isoform in the presence of such compound. Whether a particular compound of decreases cytochrome P450 enzyme activity, and the amount of such a compound required to do so, can be determined by methods know to those of ordinary skill in the art and the methods described herein.

Protein functions required for coronavirus replication and transcription are encoded by the so-called "replicase" gene. Two overlapping polyproteins are translated from this gene and extensively processed by viral proteases. The C-proximal region is processed at eleven conserved interdomain junctions by the coronavirus main or "3C-like protease. The name "3C-like" protease derives from certain similarities between the coronavirus enzyme and the well-known picornavirus 3C proteases. These include substrate preferences, use of cysteine as an active site nucleophile in catalysis, and similarities in their putative overall polypeptide folds. A comparison of the amino acid sequence of the SARS-Cov-2-associated coronavirus 3C-like protease to that of other known coronaviruses such as SARS-CoV shows the amino acid sequences have approximately 96% shared homology.

Amino acids of the substrate in the protease cleavage site are numbered from the N to the C terminus as follows: –P3-P2-P1-P1'-P2'-P3', with cleavage occurring between the P1 and P1' residues (Schechter & Berger, 1967). Substrate specificity is largely determined by the P2, P1 and P1' positions. Coronavirus main protease cleavage site specificities are highly conserved with a requirement for glutamine at P1 and a small amino acid at P1' (Journal of General Virology, 83, pp. 595-599 (2002)).

REFERENCE EXAMPLES

The compounds used in the methods of the present invention can be prepared as set forth in Examples 36, 38, 40-45 and 47-52 of WO2005/113580 and as reproduced below.

In the examples described below, unless otherwise indicated, all temperatures are set forth in degrees Celsius and all parts and percentages are by weight. Reagents may be purchased from commercial suppliers, such as Sigma-Aldrich Chemical Company, or Lancaster Synthesis Ltd. and may be used without further purification unless otherwise indicated. Tetrahydrofuran (THF) and N, N-dimethylformamide (DMF) may be purchased from Aldrich in Sure Seal bottles and used as received. All solvents may be purified using standard methods known to those skilled in the art, unless otherwise indicated.

The structures of the compounds of the following examples are confirmed by one or more of the following: proton magnetic resonance spectroscopy, elemental microanalysis and melting point. Proton magnetic resonance ($^1$H NMR) spectra are determined using a Bruker spectrometers operating at a field strength of 300 to 400 megahertz (MHz). Chemical shifts are reported in parts per million (ppm, δ) downfield from an internal tetramethylsilane standard. Alternatively, $^1$H NMR spectra were referenced to residual protic solvent signals as follows: $CHCl_3$=7.26 ppm, DMSO=2.49 ppm, $C_6HD_5$=7.15 ppm. Peak multiplicities are designated as follows: s, singlet; d, doublet; dd, doublet of doublets; t, triplet; q, quartet; br, broad resonance; m, multiplet. Coupling constants are given in Hertz. Elemental microanalyses are performed by Atlantic Microlab Inc., Norcross, GA and gave results for the elements stated with ±0.4% of the theoretical values. Flash column chromatography is performed using Silica gel 60 (Merck Art 9385) or various MPLC systems. Analytical thin layer chromatography (TLC) was performed using precoated sheets of Silica 60 $F_{254}$ (Merck Art 5719). All reactions are performed in septum-sealed flasks under a slight positive pressure of argon or dry nitrogen unless otherwise noted.

Other preferred compounds used in the methods of the invention may be prepared in manners analogous to those specifically described below.

The examples and preparations provided below further illustrate and exemplify the compounds of the present invention and methods of preparing such compounds. It is to be understood that the scope of the present invention is not limited in any way by the scope of the following examples and preparations. In the following examples molecules with a single chiral center, unless otherwise notes, exist as a racemic mixture. Those molecules with two or more chiral centers, unless otherwise noted, exits as a racemic mixture of diastereomers. Single enantiomers/diastereomers may be obtained by methods known to those skilled in the art.

Where HPLC chromatography is referred to in the preparations and examples below, the general conditions used, unless otherwise indicated, are as follows. The column used is a ZORBAXμ RXC18 column (manufactured by Hewlett Packard) of 150 mm distance and 4.6 mm interior diameter. The samples are run on a Hewlett Packard-100 system A gradient solvent method is used running 100 percent ammonium acetate/acetic acid buffer (0.2 M) to 100 percent acetonitrile over 10 minutes. The system then proceeds on a wash cycle with 100 percent acetonitrile for 1.5 minutes and then 100 percent buffer solution for 3 minutes. The flow rate over this period is a constant 3 ml/minute.

In the examples and specification DMF refers to N,N-dimethylformamide. DMSO refers to dimethylsulfoxide. CsF refers to cesium fluoride. ESI is electrospray ionization, mg is milligram, mmol is millimole, M is molar, MHz is megahertz, MPLC is medium pressure liquid chromatography, MS is mass spectrometry, HRMS is high resolution mass spectrometry and RT is room temperature.

The following Reference Examples (Examples 1-15 as set forth below) are compounds used in the methods of the present invention and are the compounds of Examples 36, 38 and 40-52 of WO2005/113580.

Example 1

(Described as Example 36 in WO2005/113580): (3S)-3-({N-[(4-methoxy-1H-indol-2-yl)carbonyl]-L-leucyl}amino)-2-oxo-4-[(3S)-2-oxopyrrolidin-3-yl] butyl acetate

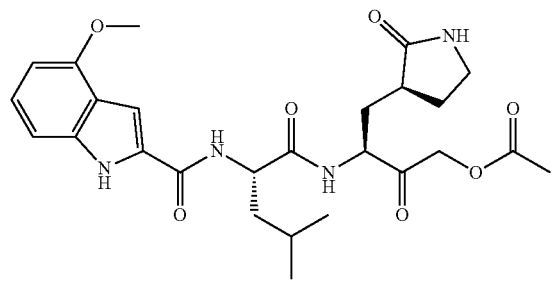 [SMILES: COc1cccc2[nH]c(C(=O)N[C@@H](CC(C)C)C(=O)N[C@@H](C[C@@H]3CCNC3=O)C(=O)COC(C)=O)cc12]

An oven-dried 40 mL scintillation vial with spinbar was charged with acetic acid (27 mg, 0.46 mmol) followed by a solution of N-((1S)-1-{[((1S)-3-chloro-2-oxo-1-{[(3S)-2-oxopyrrolidin-3-yl]methyl}propyl)amino]carbonyl}-3-methylbutyl)-4-methoxy-1H-indole-2-carboxamide (172 mg, 0.35 mmol) in DMF (3.5 mL), and purged with $N_2$. This pale yellow solution was then treated with CsF (122 mg, 0.81 mmol), sealed with a Teflon-lined screwcap, and heated at 65° C. on a reaction block with vigorous stirring. After 3 hours, the reaction was cooled to RT, diluted with water (30 mL), and extracted with dichloromethane (4×7 mL). The combined organic layers were washed with water (2×20 mL), brine (20 mL), and concentrated in vacuo. This material was purified by Biotage MPLC (25M, 2.5-4.5% methanol/dichloromethane) to afford 78 mg (45%) of the title compound as a white solid. $^1$H NMR (400 MHz, DMSO-$d_6$) δ 11.57 (s, 1H), 8.57 (d, J=7.8 Hz, 1H), 8.43 (d, J=7.6 Hz, 1H), 7.64 (s, 1H), 7.36 (d, J=1.8 Hz, 1H), 7.08 (t, J=8.0 Hz, 1H), 6.99 (d, J=8.1 Hz, 1H), 6.49 (d, J=7.6 Hz, 1H), 4.83 (d, J=3.0 Hz, 1H), 4.76-4.95 (m, 1H), 4.35-4.50 (m, 2H), 3.87 (s, 3H), 3.03-3.17 (m, 2H), 2.22-2.35 (m, 1H), 2.09-2.22 (m, 1H), 2.07 (s, 3H), 1.90-2.04 (m, 1H), 1.65-1.77 (m, 2H), 1.48-1.65 (m, 3H), 0.94 (d, J=6.3 Hz, 3H), 0.89 (d, J=6.3 Hz, 3H); MS (ESI+) for $C_{26}H_{34}N_4O_7$ m/z 515.2 (M+H)$^+$.

Example 2

(Described as Example 38 in WO2005/113580): (3S)-3-({N-[(4-methoxy-1H-indol-2-yl)carbonyl]-L-leucyl}amino)-2-oxo-4-[(3S)-2-oxopyrrolidin-3-yl] butyl pivalate

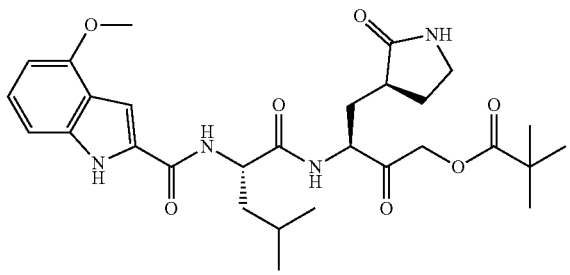 [SMILES: COc1cccc2[nH]c(C(=O)N[C@@H](CC(C)C)C(=O)N[C@@H](C[C@@H]3CCNC3=O)C(=O)COC(=O)C(C)(C)C)cc12]

Following the procedure described for the preparation of (3S)-3-({N-[(4-methoxy-1H-indol-2-yl)carbonyl]-L-leucyl}amino)-2-oxo-4-[(3S)-2-oxopyrrolidin-3-yl]butyl acetate but substituting pivalic acid and making non-critical variations provided a crude product. This material was purified by Biotage MPLC (25M, 2.5-4.5% methanol/dichloromethane) to afford 152 mg (78%) of the title compound. $^1$H NMR (400 MHz, DMSO-d$_6$) δ 11.58 (s, 1H), 8.56 (d, J=7.8 Hz, 1H), 8.44 (d, J=7.8 Hz, 1H), 7.64 (s, 1H), 7.36 (s, 1H), 7.08 (t, J=8.0 Hz, 1H), 6.99 (d, 1H), 6.49 (d, J=7.6 Hz, 1H), 4.84 (s, 1H), 4.77-4.94 (m, 1H), 4.34-4.51 (m, 2H), 3.87 (s, 3H); 3.02-3.16 (m, 2H), 1.91-2.36 (m, 3H), 1.48-1.78 (m, 5H), 1.16 (s, 9H), 0.94 (d, J=6.3 20 Hz, 3H), 0.89 (d, J=6.3 Hz, 3H); MS (ESI+) for C$_{29}$H$_{40}$N$_4$O$_7$ m/z 557.2 (M+H)$^+$.

Example 3

(Described as Example 40 in WO2005/113580): (3S)-3-({N-[(4-methoxy-1H-indol-2-yl)carbonyl]-L-leucyl}amino)-2-oxo-4-[(3S)-2-oxopyrrolidin-3-yl] butyl benzoate

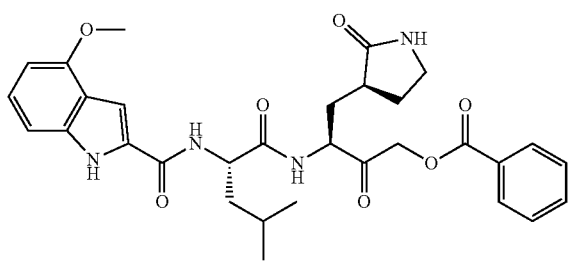 [SMILES: COc1cccc2[nH]c(C(=O)N[C@@H](CC(C)C)C(=O)N[C@@H](C[C@@H]3CCNC3=O)C(=O)COC(=O)c3ccccc3)cc12]

Following the procedure described for the preparation of (3S)-3-({N-[(4-methoxy-1H-indol-2-yl)carbonyl]-L-leucyl}amino)-2-oxo-4-[(3S)-2-oxopyrrolidin-3-yl]butyl acetate but substituting benzoic acid and making non-critical variations provided a crude product. This material was purified by Biotage MPLC (25M, 2.5-4.5% methanol/dichloromethane) to afford 183 mg (91%) of the title compound. $^1$H NMR (400 MHz, DMSO-d$_6$) δ 11.59 (s, 1H), 8.64 (d, J=8.1 Hz, 1H), 8.46 (d, J=7.6 Hz, 1H), 7.98 (d, J=8.1 Hz, 2H), 7.91-7.95 (m, 1H), 7.66-7.71 (m, 1H), 7.66 (s, 1H), 7.52-7.57 (m, 1H), 7.37 (d, J=1.8 Hz, 1H), 7.08 (t, J=8.0 Hz, 1H), 6.96-7.02 (m, 1H), 6.49 (d, J=7.6 Hz, 1H), 5.13 (s, 1H), 5.06-5.24 (m, 1H), 4.44-4.53 (m, 2H), 3.87 (s, 3H), 3.04-3.15 (m, 2H), 2.34 (m, 1H), 2.07-2.27 (m, 1H), 1.98-2.07 (m, 1H), 1.52-1.79 (m, 5H), 0.94 (d, J=6.3 Hz, 3H), 0.89 (d, J=6.3 Hz, 3H); MS (ESI+) for C$_{31}$H$_{36}$N$_4$O$_7$ m/z 577.2 (M+H)$^+$.

Example 4

(Described as Example 41 in WO2005/113580): (3S)-3-({N-[(4-methoxy-1H-indol-2-yl)carbonyl]-L-leucyl}amino)-2-oxo-4-[(3S)-2-oxopyrrolidin-3-yl] butyl 4-methylbenzoate

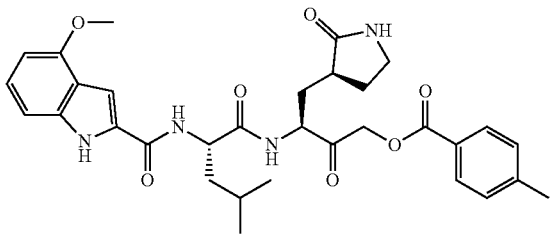 [SMILES: COc1cccc2[nH]c(C(=O)N[C@@H](CC(C)C)C(=O)N[C@@H](C[C@@H]3CCNC3=O)C(=O)COC(=O)c3ccc(C)cc3)cc12]

Following the procedure described for the preparation of (3S)-3-({N-[(4-methoxy-1H-indol-2-yl)carbonyl]-L-leucyl}amino)-2-oxo-4-[(3S)-2-oxopyrrolidin-3-yl]butyl acetate but substituting 4-methylbenzoic acid and making non-critical variations provided a crude product. This material was purified by Biotage MPLC (25M, 2.5-4.5% methanol/dichloromethane) to afford 92 mg (44%) of the title compound. $^1$H NMR (400 MHz, DMSO-d$_6$) δ 11.59 (d, J=1.8 Hz, 1H), 8.63 (d, J=8.1 Hz, 1H), 8.46 (d, J=7.6 Hz, 1H), 7.87 (d, J=8.1 Hz, 2H), 7.65 (s, 1H), 7.37 (d, J=1.8 Hz, 1H), 7.34 (d, J=8.3 Hz, 2H), 7.08 (t, J=8.0 Hz, 1H), 6.97-7.01 (m, 1H), 6.50 (d, J=7.8 Hz, 1H), 5.09 (s, 1H), 5.03-5.20 (m, 1H), 4.43-4.52 (m, 2H), 3.87 (s, 3H), 3.04-3.17 (m, 2H), 2.38 (s, 3H), 2.28-2.34 (m, 1H), 2.06-2.14 (m, 1H), 1.96-2.06 (m, 1H), 1.51-1.78 (m, 5H), 0.94 (d, J=6.3 Hz, 3H), 0.89 (d, J=6.3 Hz, 3H); MS (ESI+) C$_{32}$H$_{38}$N$_4$O$_7$ m/z 591.2 (M+H)$^+$.

Example 5

(Described as Example 42 in WO2005/113580): (3S)-3-({N-[(4-methoxy-1H-indol-2-yl)carbonyl]-L-leucyl}amino)-2-oxo-4-[(3S)-2-oxopyrrolidin-3-yl] butyl 4-fluorobenzoate

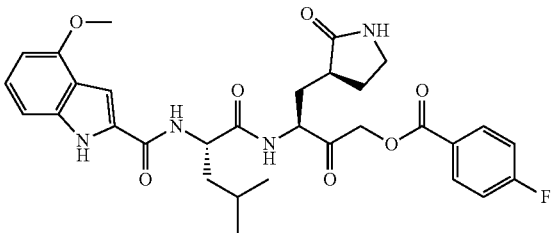 [SMILES: COc1cccc2[nH]c(C(=O)N[C@@H](CC(C)C)C(=O)N[C@@H](C[C@@H]3CCNC3=O)C(=O)COC(=O)c3ccc(F)cc3)cc12]

Following the procedure described for the preparation of (3S)-3-({N-[(4-methoxy-1H-indol-2-yl)carbonyl]-L-leucyl}amino)-2-oxo-4-[(3S)-2-oxopyrrolidin-3-yl]butyl acetate but substituting 4-fluorobenzoic acid and making non-critical variations provided a crude product. This material was purified by Biotage MPLC (25M, 2.5-4.5% methanol/dichloromethane) to afford 136 mg (65%) of the title compound. $^1$H NMR (400 MHz, DMSO-d$_6$) δ 11.58 (d, J=2.0 Hz, 1H), 8.63 (d, J=7.8 Hz, 1H), 8.46 (d, J=7.6 Hz, 1H), 8.04 (dd, J=8.6, 5.6 Hz, 2H), 7.65 (s, 1H), 7.35-7.41 (m, 3H), 7.08 (t, J=8.0 Hz, 1H), 6.99 (d, J=8.1 Hz, 1H), 6.50 (d, J=7.6 Hz, 1H), 5.12 (d, J=1.3 Hz, 1H), 5.06-5.23 (m, 1H), 4.44-4.52 (m, 2H), 3.87 (s, 3H), 3.04-3.17 (m, 2H), 2.28-2.38 (m, 1H), 2.07-2.26 (m, 1H), 1.98-2.06 (m, 1H), 1.52-1.79 (m, 5H), 0.94 (d, J=6.3 Hz, 3H), 0.89 (d, J=6.3 Hz, 3H); MS (ESI+) for $C_{31}H_{35}FN_4O_7$ m/z 595.2 (M+H)+.

Example 6

(Described as Example 43 in WO2005/113580): (3S)-3-({N-[(4-methoxy-1H-indol-2-yl)carbonyl]-L-leucyl}amino)-2-oxo-4-[(3S)-2-oxopyrrolidin-3-yl] butyl 4-cyanobenzoate

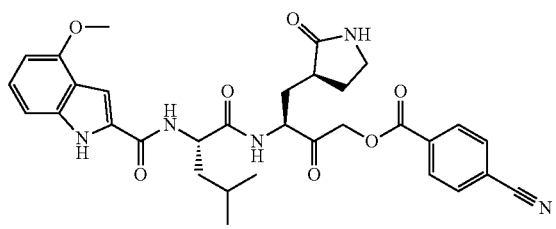 [SMILES: COc1cccc2[nH]c(C(=O)N[C@@H](CC(C)C)C(=O)N[C@@H](C[C@@H]3CCNC3=O)C(=O)COC(=O)c3ccc(C#N)cc3)cc12]

Following the procedure described for the preparation of (3S)-3-({N-[(4-methoxy-1H-indol-2-yl)carbonyl]-L-leucyl}amino)-2-oxo-4-[(3S)-2-oxopyrrolidin-3-yl]butyl acetate but substituting 4-cyanobenzoic acid and making non-critical variations provided a crude product. This material was purified by Biotage MPLC (25M, 2.5-4.5% methanol/dichloromethane) to afford 159 mg (75%) of the title compound. $^1$H NMR (400 MHz, DMSO-$d_6$) δ 11.58 (d, J=2.0 Hz, 1H), 8.64 (d, J=8.1 Hz, 1H), 8.46 (d, J=7.6 Hz, 1H), 8.09-8.14 (m, 2H), 7.99-8.05 (m, 2H), 7.66 (s, 1H), 7.37 (d, J=1.5 Hz, 1H), 7.08 (t, J=8.0 Hz, 1H), 6.99 (d, J=8.3 Hz, 1H), 6.50 (d, J=7.6 Hz, 1H), 5.17 (d, J=2.8 Hz, 1H), 5.11-5.27 (m, 1H), 4.44-4.53 (m, 2H), 3.87 (s, 3H), 3.04-3.17 (m, 2H), 2.28-2.38 (m, 1H), 2.07-2.26 (m, 1H), 1.97-2.06 (m, 1H), 1.51-1.78 (m, 5H), 0.94 (d, J=6.3 Hz, 3H), 0.89 (d, J=6.3 Hz, 3H); MS (ESI+) for $C_{32}H_{35}N_5O_7$ m/z 602.2 (M+H)+.

Example 7

(Described as Example 44 in WO2005/113580): (3S)-3-({N-[(4-methoxy-1H-indol-2-yl)carbonyl]-L-leucyl}amino)-2-oxo-4-[(3S)-2-oxopyrrolidin-3-yl] butyl 4-methoxybenzoate

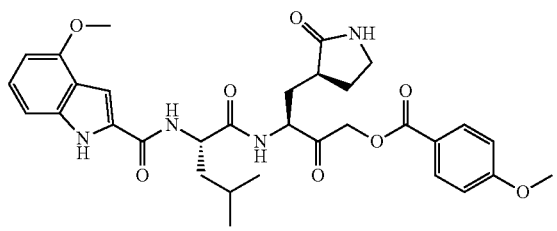 [SMILES: COc1ccc(C(=O)OCC(=O)[C@H](C[C@@H]2CCNC2=O)NC(=O)[C@H](CC(C)C)NC(=O)c2cc3c(OC)cccc3[nH]2)cc1]

Following the procedure described for the preparation of (3S)-3-({N-[(4-methoxy-1H-indol-2-yl)carbonyl]-L-leucyl}amino)-2-oxo-4-[(3S)-2-oxopyrrolidin-3-yl]butyl acetate but substituting 4-methoxybenzoic acid and making non-critical variations provided a crude product. This material was purified by Biotage MPLC (25M, 2.5-4.5% methanol/dichloromethane) to afford 145 mg (68%) of the title compound. $^1$H NMR (400 MHz, DMSO-$d_6$) δ 11.59 (d, J=1.8 Hz, 1H), 8.62 (d, J=7.8 Hz, 1H), 8.46 (d, J=7.6 Hz, 1H), 7.93 (d, J=9.1 Hz, 2H), 7.65 (s, 1H), 7.37 (d, J=2.0 Hz, 1H), 7.04-7.11 (m, 2H), 7.00 (dd, J=8.6, 3.0 Hz, 2H), 6.50 (d, J=7.6 Hz, 1H), 5.07 (s, 1H), 5.01-5.18 (m, 1H), 4.44-4.51 (m, 2H), 3.87 (s, 3H), 3.83 (s, 3H), 3.04-3.17 (m, 2H), 2.28-2.38 (m, 1H), 2.07-2.25 (m, 1H), 1.97-2.06 (m, 1H), 1.50-1.79 (m, 5H), 0.94 (d, J=6.3 Hz, 3H), 0.89 (d, J=6.3 Hz, 3H); MS (ESI+) for $C_{32}H_{38}N_4O_8$ m/z 607.2 (M+H)+.

Example 8

(Described as Example 45 in WO2005/113580): (3S)-3-({N-[(4-methoxy-1H-indol-2-yl)carbonyl]-L-leucyl}amino)-2-oxo-4-[(3S)-2-oxopyrrolidin-3-yl] butyl 4-chlorobenzoate

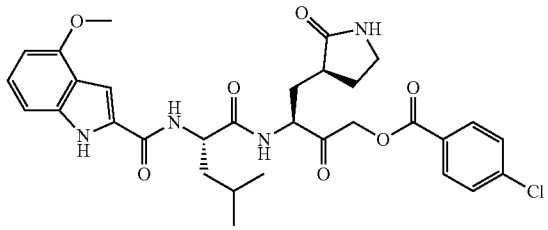 [SMILES: COc1cccc2[nH]c(C(=O)N[C@@H](CC(C)C)C(=O)N[C@@H](C[C@@H]3CCNC3=O)C(=O)COC(=O)c3ccc(Cl)cc3)cc12]

Following the procedure described for the preparation of (3S)-3-({N-[(4-methoxy-1H-indol-2-yl)carbonyl]-L-leucyl}amino)-2-oxo-4-[(3S)-2-oxopyrrolidin-3-yl]butyl acetate but substituting 4-chlorobenzoic acid and making non-critical variations provided a crude product. This material was purified by Biotage MPLC (25M, 2.5-4.5% methanol/dichloromethane) to afford 172 mg (80%) of the title compound. $^1$H NMR (400 MHz, DMSO-$d_6$) δ 11.58 (d, J=1.8 Hz, 1H), 8.63 (d, J=7.8 Hz, 1H), 8.46 (d, J=7.6 Hz, 1H), 7.98 (d, J=8.6 Hz, 2H), 7.65 (s, 1H), 7.62 (d, J=8.6 Hz, 2H), 7.37 (d, J=1.8 Hz, 1H), 7.08 (t, J=8.0 Hz, 1H), 6.99 (d, J=8.3 Hz, 1H), 6.50 (d, J=7.6 Hz, 1H), 5.13 (d, J=1.5 Hz, 1H), 5.07-5.23 (m, 1H), 4.44-4.52 (m, 2H), 3.87 (s, 3H), 3.04-3.14 (m, 2H), 2.28-2.38 (m, 1H), 2.06-2.26 (m, 1H), 1.97-2.06 (m, 1H), 1.51-1.78 (m, 5H), 0.94 (d, J=6.3 Hz, 3H), 0.89. (d, J=6.3 Hz, 3H); MS (ESI+) for $C_{31}H_{35}ClN_4O_7$ m/z 611.1 (M+H)+

Example 9

(Described as Example 46 in WO2005/113580):
(3S)-3-({N-[(4-methoxy-1H-indol-2-yl)carbonyl]-L-leucyl}amino)-2-oxo-4-[(3S)-2-oxopyrrolidin-3-yl] butyl 2,6-dichlorobenzoate

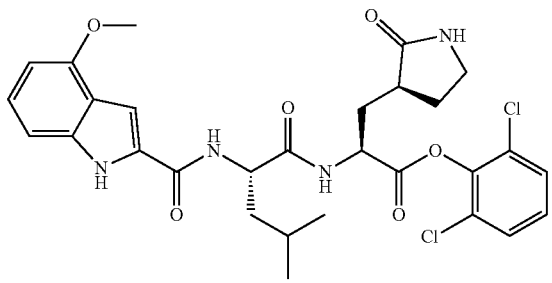 [SMILES: COc1cccc2[nH]c(C(=O)N[C@@H](CC(C)C)C(=O)N[C@@H](C[C@@H]3CCNC3=O)C(=O)Oc3c(Cl)cccc3Cl)cc12]

Following the procedure described for the preparation of (3S)-3-({N-[(4-methoxy-1H-indol-2-yl)carbonyl]-L-leucyl}amino)-2-oxo-4-[(3S)-2-oxopyrrolidin-3-yl]butyl acetate but substituting 2,6-dichlorobenzoic acid and making non-critical variations provided a crude product. This material was purified by LC (20 g 230-400 $SiO_2$, 3% methanol/chloroform) to afford 114 mg (65%) of the title compound as a white solid. $^1$H NMR (DMSO-$d_6$) δ 11.57 (d, J=2 Hz, 1H), 8.62 (d, J=8 Hz, 1H), 8.46 (d, J=4 Hz, 1 H), 7.65-7.53 (m, 4H), 7.36 (s, 1H), 7.08 (t, J=8 Hz, 1H), 6.99 (d, J=8 Hz, 1H), 6.49 (d, J=8 Hz, 1H), 5.19 (d, J=20 Hz, 1H), 5.15 (d, J=20 Hz, 1H), 4.51 (m, 2H), 3.87 (s, 3H), 3.11 (m, 2H), 2.30 (m, 1H), 2.06 (m, 2H), 1.76-1.51 (m, 5H), 0.94 (d, J=8 Hz, 3H), 0.89 (d, J=8 Hz, 3H); MS (ESI+) for $C_{31}H_{34}Cl_2N_4O_7$ m/z 645.1 (M+H)$^+$; Anal. Calcd for $C_{31}H_{34}Cl_2N_4O_7$•0.2 $H_2O$: C, 57.36; H, 5.34; N, 8.63. Found: C, 57.23; H, 5.55; N, 8.46. HRMS (ESI+) Calcd for $C_{31}H_{34}Cl_2N_4O_7$+H1 645.1877, found 645.1871.

Example 10

(Described as Example 47 in WO2005/113580):
(3S)-3-({N-[(4-methoxy-1H-indol-2-yl)carbonyl]-L-leucyl}amino)-2-oxo-4-[(3S)-2-oxopyrrolidin-3-yl] butyl 2,6-dimethylbenzoate

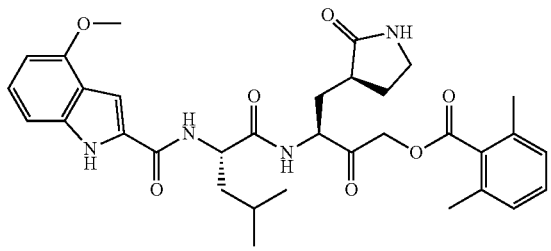 [SMILES: COc1cccc2[nH]c(C(=O)N[C@@H](CC(C)C)C(=O)N[C@@H](C[C@@H]3CCNC3=O)C(=O)COC(=O)c3c(C)cccc3C)cc12]

Following the procedure described for the preparation of (3S)-3-({N-[(4-methoxy-1H-indol-2-yl)carbonyl]-L-leucyl}amino)-2-oxo-4-[(3S)-2-oxopyrrolidin-3-yl]butyl acetate but substituting 2,6-dimethylbenzoic acid and making non-critical variations provided a crude brown foam. This material was purified by Biotage MPLC (25M, 3-4% methanol/dichloromethane) to afford 177 mg (73%) of the title compound as an off-white glass. $^1$H NMR (DMSO-$d_6$) δ 11.58 (d, J=2 Hz, 1H), 8.63 (d, J=8 Hz, 1H), 8.46 (d, J=8 Hz, 1H), 7.65 (s, 1H), 7.36 (s, 1H), 7.25 (t, J=8 Hz, 1H), 7.08 (m, 3H), 7.00 (d, J=8 Hz, 1H), 6.49 (d, J=8 Hz, 1H), 5.11 (s, 2H), 4.51 (m, 2H), 3.87 (s, 3H), 3.10 (m, 2H), 2.32-2.21 (m, 7H), 2.07 (m, 2H), 1.78-1.53 (m, 5H), 0.94 (d, J=8 Hz, 3H), 0.89 (d, J=8 Hz, 3H); MS (ESI+) for $C_{33}H_{40}N_4O_7$ m/z 605.2 (M+H)$^+$; Anal. Calcd for $C_{33}H_{40}N_4O_7$•0.3 $H_2O$•0.2 $CHCl_3$: C, 62.90; H, 6.49; N, 8.84. Found: C, 62.95; H, 6.42; N, 8.72. HRMS (ESI+) Calcd for $C_{33}H_{40}N_4O_7$+H1 605.2970, found 605.2985.

Example 11

(Described as Example 48 in WO2005/113580):
(3S)-3-({N-[(4-methoxy-1H-Indol-2-yl)carbonyl]-L-leucyl}amino)-2-oxo-4-[(3S)-2-oxopyrrolidin-3-yl] butyl 2,6-difluorobenzoate

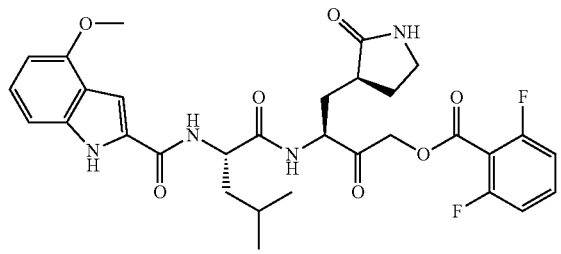 [SMILES: COc1cccc2[nH]c(C(=O)N[C@@H](CC(C)C)C(=O)N[C@@H](C[C@@H]3CCNC3=O)C(=O)COC(=O)c3c(F)cccc3F)cc12]

Following the procedure described for the preparation of (3S)-3-({N-[(4-methoxy-1H-indol-2-yl)carbonyl]-L-leucyl}amino)-2-oxo-4-[(3S)-2-oxopyrrolidin-3-yl]butyl acetate but substituting 2,6-difluorolbenzoic acid and making non-critical variations provided a crude brown oily solid. This material was triturated with chloroform/ethyl acetate to afford 180 mg (75%) of the title compound as white solid. $^1$H NMR (DMSO-$d_6$) δ 11.65 (d, J=2 Hz, 1H), 8.68 (d, J=8 Hz, 1H), 8.54 (d, J=8 Hz, 1H), 7.73-7.65 (m, 2H), 7.36 (s, 1H), 7.27 (t, J=8 Hz, 1H), 7.08 (t, J=8 Hz, 1H), 6.99 (d, J=8 Hz, 1H), 6.49 (d, J=8 Hz, 1H), 5.19 (d, J=16 Hz, 1H), 5.14 (d, J=16 Hz, 1H), 4.48 (m, 2H), 3.87 (s, 3H), 3.11 (m, 2H), 2.32 (m, 1H), 2.11-1.91 (m, 2H), 1.81-1.56 (m, 5H), 0.94 (d, J=4 Hz, 3H), 0.89 (d, J=4 Hz, 3H); MS (ESI+) for $C_{31}H_{34}F_2N_4O_7$ m/z 613.2 (M+H)$^+$; HRMS (ESI+) Calcd for $C_{31}H_{34}F_2N_4O_7$+H1 613.2469, found 613.2476.

Example 12

(Described as Example 49 in WO2005/113580):
(3S)-3-({N-[(4-methoxy-1H-indol-2-yl)carbonyl]-L-leucyl}amino)-2-oxo-4-[(3S)-2-oxopyrrolidin-3-yl] butyl 2,6-dimethoxybenzoate

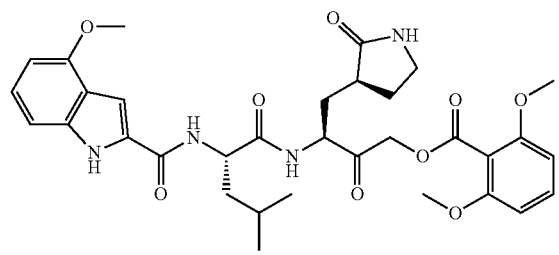 [SMILES: COc1cccc(OC)c1C(=O)OCC(=O)[C@H](C[C@@H]1CCNC1=O)NC(=O)[C@H](CC(C)C)NC(=O)c1cc2c(OC)cccc2[nH]1]

Following the procedure described for the preparation of (3S)-3-({N-[(4-methoxy-1H-indol-2-yl)carbonyl]-L-leucyl}amino)-2-oxo-4-[(3S)-2-oxopyrrolidin-3-yl]butyl acetate but substituting 2,6-dimethoxybenzoic acid and making non-critical variations provided a crude brown foam. This material was purified by Biotage MPLC (25M, 3-4% methanol/dichloromethane) to afford 169 mg (66%) of the title compound as an off-white solid. $^1$H NMR (DMSO-$d_6$) δ 11.58 (d, J=2 Hz, 1H), 8.55 (d, J=8 Hz, 1H), 8.45 (d, J=8 Hz, 1H), 7.64 (s, 1H), 7.40-7.35 (m, 2H), 7.08 (t, J=8 Hz, 1H), 7.00 (d, J=8 Hz, 1 H), 6.71 (d, J=8 Hz, 1H), 6.50 (d, J=8 Hz, 1H), 5.01 (d, J=16 Hz, 1H), 4.95 (d, J=16 Hz, 1H), 4.53-4.48 (m, 2H), 3.87 (s, 3H), 3.75 (s, 6H), 3.08 (m, 2H), 2.31 (m, 1H), 2.11-1.90 (m, 2H), 1.75-1.55 (m, 5H), 0.94 (d, J=8 Hz, 3H), 0.89 (d, J=8 Hz, 3H); MS (ESI+) for $C_{33}H_{40}N_4O_9$ m/z 637.2 (M+H)$^+$; Anal. Calcd for $C_{33}H_{40}N_4O_9$•0.25 $H_2O$ •0.25 $CHCl_3$: C, 59.51; H, 6.12; N, 8.35. Found: C, 59.49; H, 6.08; N, 8.42.

Example 13

(Described as Example 50 in WO2005/113580): (3S)-3-({N-[(4-methoxy-1H-indol-2-yl)carbonyl]-L-leucyl}amino)-2-oxo-4-[(3S)-2-oxopyrrolidin-3-yl] butyl 4-chloro-2-hydroxybenzoate

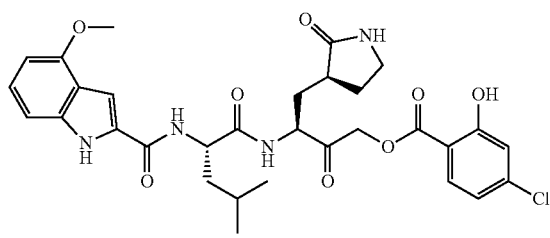 [SMILES: COc1cccc2[nH]c(C(=O)N[C@@H](CC(C)C)C(=O)N[C@@H](C[C@@H]3CCNC3=O)C(=O)COC(=O)c3ccc(Cl)cc3O)cc12]

Following the procedure described for the preparation of (3S)-3-({N-[(4-methoxy-1H-indol-2-yl)carbonyl]-L-leucyl}amino)-2-oxo-4-[(3S)-2-oxopyrrolidin-3-yl]butyl acetate but substituting 4-chlorosalicylic acid and making non-critical variations provided a crude brown syrup. This material was purified by Biotage MPLC (25M, 2-3% methanol/dichloromethane) to afford 64 mg (25%) of the title compound as a tan solid. $^1$H NMR (DMSO-$d_6$) δ 11.58 (s, 1H), 10.50 (bs, 1H), 8.65 (d, J=8 Hz, 1H), 8.46 (d, J=8 Hz, 1H), 7.81 (d, J=8 Hz, 1H), 7.63 (m, 1H), 7.37 (s, 1H), 7.08 (m, 2H), 7.00 (m, 2H), 6.50 (d, J=8 Hz, 1H), 5.16 (d, J=16 Hz, 2H), 5.11 (d, J=16 Hz, 2H), 4.49 (m, 2H), 3.87 (s, 3H), 3.13 (m, 2H), 2.32 (m, 1H), 2.11-1.98 (m, 2H), 1.76-1.55 (m, 5H), 0.94 (d, J=6 Hz, 3H), 0.89 (d, J=6 Hz, 3H); MS (ESI-) for $C_{31}H_{35}ClN_4O_8$ m/z 625.1 (M-H)$^-$; Anal Calcd for $C_{31}H_{35}ClN_4O_8$•0.1 $H_2O$•0.14 $CHCl_3$: C, 57.93; H, 5.52; N, 8.68. Found: C, 58.04; H, 5.78; N, 8.74; HRMS (ESI+) Calcd for $C_{31}H_{35}ClN_4O_8$+H1 627.2216, found 627.2219.

Example 14

(Described as Example 51 in WO2005/113580): (3S)-3-({N-[(4-methoxy-1H-indol-2-yl)carbonyl]-L-leucyl}amino)-2-oxo-4-[(3S)-2-oxopyrrolidin-3-yl] butyl 4-cyano-2-fluorobenzoate

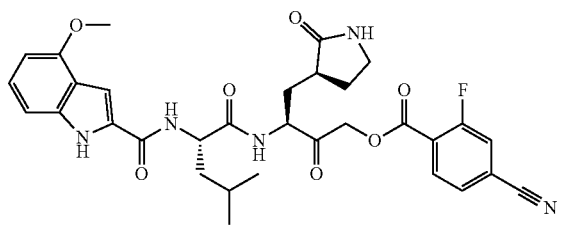

Following the procedure described for the preparation of (3S)-3-({N-[(4-methoxy-1H-indol-2-yl)carbonyl]-L-leucyl}amino)-2-oxo-4-[(3S)-2-oxopyrrolidin-3-yl]butyl acetate but substituting 4-cyano-2-fluorobenzoic acid and making non-critical variations provided a crude oily brown solid. This material was purified by Biotage MPLC (25M, 2.5-3.5% methanol/dichloromethane) to afford 119 mg (48%) of the title compound as an off-white powder. $^1$H NMR (DMSO-$d_6$) δ 11.58 (d, J=2 Hz, 1H), 8.63 (d, J=8 Hz, 1H), 8.46 (d, J=8 Hz, 1H), 8.06 (m, 2H), 7.83 (d, J=8 Hz, 1H), 7.65 (s, 1H), 7.36 (d, J=2 Hz, 1H), 7.08 (t, J=8 Hz, 1H), 6.99 (d, J=8 Hz, 1H), 6.50 (d, J=8 Hz, 1H), 5.16 (d, J=16 Hz, 1H), 5.11 (d, J=16 Hz, 1H), 4.49 (m, 2H), 3.87 (s, 3H), 3.11 (m, 2H), 2.32 (m, 1H), 2.10-1.98 (m, 2H), 1.77-1.53 (m, 5H), 0.94 (d, J=6 Hz, 3H), 0.89 (d, J=6 Hz, 3H); MS (ESI+) for $C_{32}H_{34}FN_5O_7$ m/z 620.1 (M+H)$^+$; Anal Calcd for $C_{32}H_{34}FN_5O_7$•0.3 $H_2O$: C, 61.49; H, 5.58; N, 11.20. Found: C, 61.47; H, 5.61; N, 10.98; HRMS (ESI+) Calcd for $C_{32}H_{34}FN_5O_7$+H1 620.2515, found 620.2532.

Example 15

(Described as Example 52 in WO2005/113580): (3S)-3-({N-[(4-methoxy-1H-indol-2-yl)carbonyl]-L-leucyl}amino)-2-oxo-4-[(3S)-2-oxopyrrolidin-3-yl] butyl 2-cyanobenzoate

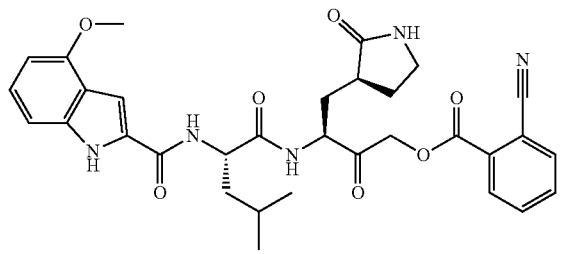 [SMILES: COc1cccc2[nH]c(C(=O)N[C@@H](CC(C)C)C(=O)N[C@@H](C[C@@H]3CCNC3=O)C(=O)COC(=O)c3ccccc3C#N)cc12]

Following the procedure described for the preparation of (3S)-3-({N-[(4-methoxy-1H-indol-2-yl)carbonyl]-L-leucyl}amino)-2-oxo-4-[(3S)-2-oxopyrrolidin-3-yl]butyl acetate but substituting 2-cyanobenzoic acid and making non-critical variations provided a crude brown oily solid. This material was triturated with chloroform/ethyl acetate to afford 91 mg (38%) of the title compound as white solid. $^1$H NMR (DMSO-$d_6$) δ 11.58 (s, 1H), 8.65 (d, J=8 Hz, 1H), 8.46

(d, J=8 Hz, 1H), 8.17 (m, 1H), 8.04 (m, 1H), 7.88 (m, 1 H), 7.65 (s, 1H), 7.37 (s, 1H), 7.08 (t, J=8 Hz, 1H), 6.99 (d, J=8 Hz, 1H), 6.49 (d, J=8 Hz, 1H), 5.19 (m, 2H), 4.50 (m, 2H), 3.87 (s, 3H), 3.11 (m, 2H), 2.32 (m, 1H), 2.07-1.97 (m, 2H), 1.76-1.56 (m, 5H), 0.94 (d, J=6 Hz, 3H), 0.89 (d, J=6 Hz, 3H); MS (ESI+) for $C_{32}H_{35}N_5O_7$ m/z 602.2 (M+H)$^+$; Anal Calcd for $C_{32}H_{35}N_5O_7 \cdot 0.4$ $H_2O$: C, 63.12, H, 5.93; N, 11.50. Found: C, 63.16; H, 5.96; N, 11.43; HRMS (ESI+) Calcd for $C_{32}H_{35}N_5O_7$+H1 602.2609, found 602.2610.

Docking Experiments

Methods:

Homology Modeling. The sequence of 3C-like proteinase in SARS and COVID-19 can be found in references from the RCSB (e.g., 31WM)[1] and the NCBI (e.g., Reference Sequence: YP_009725301.1NCBI)[2].

```
SARS 3C Protease Sequence (PDB 3IWM):
SGFRKMAFPSGKVEGCMVQVTCGTTTLNGLWLDDTVYCPRHVICTAEDM
LNPNYEDLLIRKSNHSFLVQAGNVQLRVI
GHSMQNCLLRLKVDTSNPKTPKYKFVRIQPGQTFSVLACYNGSPSGVYQ
CAMRPNHTIKGSFLNGSCGSVGFNIDYDCV
SFCYMHHMELPTGVHAGTDLEGKFYGPFVDRQTAQAAGTDTTITLNVLA
WLYAAVINGDRWFLNRFTTTLNDFNLVA
MKYNYEPLTQDHVDILGPLSAQTGIAVLDMCAALKELLQNGMNGRTILG
STILEDEFTPFDVVRQCSGVTFQ New Wuhan Coronavirus SARS-CoV-2 Sequence
(same section):
SGFRKMAFPSGKVEGCMVQVTCGTTTLNGLWLDDVVYCPRHVICTSEDM
LNPNYEDLLIRKSNHNFLVQAGNVQLRVI
GHSMQNCVLKLKVDTANPKTPKYKFVRIQPGQTFSVLACYNGSPSGVYQ
CAMRPNFTIKGSFLNGSCGSVGFNIDYDCV
SFCYMHHMELPTGVHAGTDLEGNFYGPFVDRQTAQAAGTDTTITVNVLA
WLYAAVINGDRWFLNRFTTTLNDFNLVA
MKYNYEPLTQDHVDILGPLSAQTGIAVLDMCASLKELLQNGMNGRTILG
SALLEDEFTPFDVVRQCSGVTFQ
```

A homology model was built from a crystal structure of SARS 3C-like protease in Pfizer's database using Schrödinger's PRIME[3]. Minimization of the homology model in complex with ligands was used to remove clashes with ligands containing benzothiazole ketones or a benzyl side chains after examining the protein conformations of other SARS 3C-like crystal structures with these ligand moieties. Relaxation of residues in the 185-190 loop, His41 and Met49 to led to three differently minimized versions of the homology model. The catalytic Cys was mutated to Gly (C145G) to facilitate AGDOCK core docking and subsequent scoring without a clash with the catalytic Cys.

Docking: Compounds are docked into the homology models using core docking[4] with AGDOCK[5]. The docking is performed without forming the protein-ligand covalent bond. Instead, a common core that included the lactam side chain and reactive ketone was identified in the ligands and held fixed in the crystal structure orientation as a mimic of covalent docking (See FIG. 2). The affinity measure for AGDOCK core docking is HT Score[6].

Method References:
1. http://ww.rcsb.org/structure/3IWM
2. https://www.ncbi.nlm.nih.gov/protein/YP_009725301.1
3. Schrödinger Release 2019-1: Prime, Schrödinger, LLC, New York, NY, 2019.
4. Daniel K. Gehlhaar, Gennady M. Verkhivker, Paul A. Rejto, Christopher J. Sherman, David R. Fogel, Lawrence J. Fogel, Stephan T. Freer, Molecular recognition of the inhibitor AG-1343 by HIV-1 protease: conformationally flexible docking by evolutionary programming, Chemistry & Biology, Volume 2, Issue 5, 1995, Pages 317-324.
5. Daniel K. Gehlhaar, Djamal Bouzida, and Paul A. Rejto, Reduced Dimensionality in Ligand—Protein Structure Prediction: Covalent Inhibitors of Serine Proteases and Design of Site-Directed Combinatorial Libraries Rational Drug Design. Jul. 7, 1999, 292-311.
6. Tami J. Marrone, Brock A. Luty, Peter W. Röse, Discovering high-affinity ligands from the computationally predicted structures and affinities of small molecules bound to a target: A virtual screening approach. Perspectives in Drug Discovery and Design 20, 209-230 (2000).

Results:

Homology model: The sequence homology between SARS-CoV and SARS-CoV-2 is 96.1%. There are 12 of 306 residues that are different (T35V, A46S, S65N, L86V, R88K, S94A, H134F, K180N, L202V, A267S, T285A & 1286L highlighted in cyan in Figure A) which translates to 96.1% identity.

The ligand associated with the crystal structure used to build the homology model is Compound B, N-((1S)-1-{[((1S)-3-hydroxy-2-oxo-1-{[(3S)-2-oxopyrrolidin-3-yl]methyl}propyl)amino]carbonyl}-3-methylbutyl)-4-methoxy-1H-indole-2-carboxamide. The amino acid residue nearest to Compound B, N-((1S)-1-{[((1S)-3-hydroxy-2-oxo-1-{[(3S)-2-oxopyrrolidin-3-yl]methyl}propyl)amino]carbonyl}-3-methylbutyl)-4-methoxy-1H-indole-2-carboxamide, that differed between SARS 3C-like protease and SARS-CoV-2 3C-like protease model is A46S, and the minimum distance from $C_{alpha}$ to ligand is 8.3 Å. Other residues are between 11 Å and 38 Å from the nearest atom in Compound B.

TABLE 1

Approximate distances from $C_{alpha}$ atoms in SARS-CoV-2 to Compound B, N-((1S)-1-{[((1S)-3-hydroxy-2-oxo-1-{[(3S)-2-oxopyrrolidin-3-yl]methyl}propyl)amino]carbonyl}-3-methylbutyl)-4-methoxy-1H-indole-2-carboxamide

| SARS-CoV-2 Amino Acid Residues | Distance to Nearest Atom in Compound B (Angstroms) |
| --- | --- |
| T35V | ~19 |
| A46S | ~8 |
| S65N | ~16 |
| L86V | ~11 |
| R88K | ~15 |
| S94A | ~24 |
| H134F | ~14 |
| K180N | ~13 |
| L202V | ~27 |
| A267S | ~38 |
| T285A | ~34 |
| I286L | ~31 |

FIG. 1 depicts the residue differences between SARS-CoV and SARS-CoV-2. Residue changes are highlighted in cyan in this ribbon depiction of SARS-CoV-2 homology model. The Compound B, N-((1S)-1-{[((1S)-3-hydroxy-2-oxo-1-{[(3S)-2-oxopyrrolidin-3-yl]methyl}propyl)amino]carbonyl}-3-methylbutyl)-4-methoxy-1H-indole-2-carboxamide, location is shown in magenta. The approximate distance between the C-alpha of a SARS-CoV-2 amino acid residue and the closest atom in the Compound B, N-((1S)-1-{[((1S)-3-hydroxy-2-oxo-1-{[(3S)-2-oxopyrrolidin-3-yl]methyl}propyl)amino]carbonyl}-3-methylbutyl)-4-methoxy-1H-indole-2-carboxamide, is shown in Table 1, above.

Docking Results:

The approximately 96% homology of SARS-CoV-2 3CL to SARS-CoV 3CL and the similarity between ligands allows a comparison of the RMSD between the peptide backbone of xtal ligand in SARS-CoV (see FIG. 2) and the docked ligand in the SARS-CoV-2 3CL model. The core-docked ligand RMSD to the peptide backbone did not differ by more than 0.32 Å (average 0.28 Å). See FIG. 2 for an example. In the case of Compound B, N-((1S)-1-{[((1S)-3-hydroxy-2-oxo-1-{[(3S)-2-oxopyrrolidin-3-yl]methyl}propyl)amino]carbonyl}-3-methylbutyl)-4-methoxy-1H-indole-2-carboxamide; the RMSD for the whole molecule was 0.37 Å.

Figure 2:
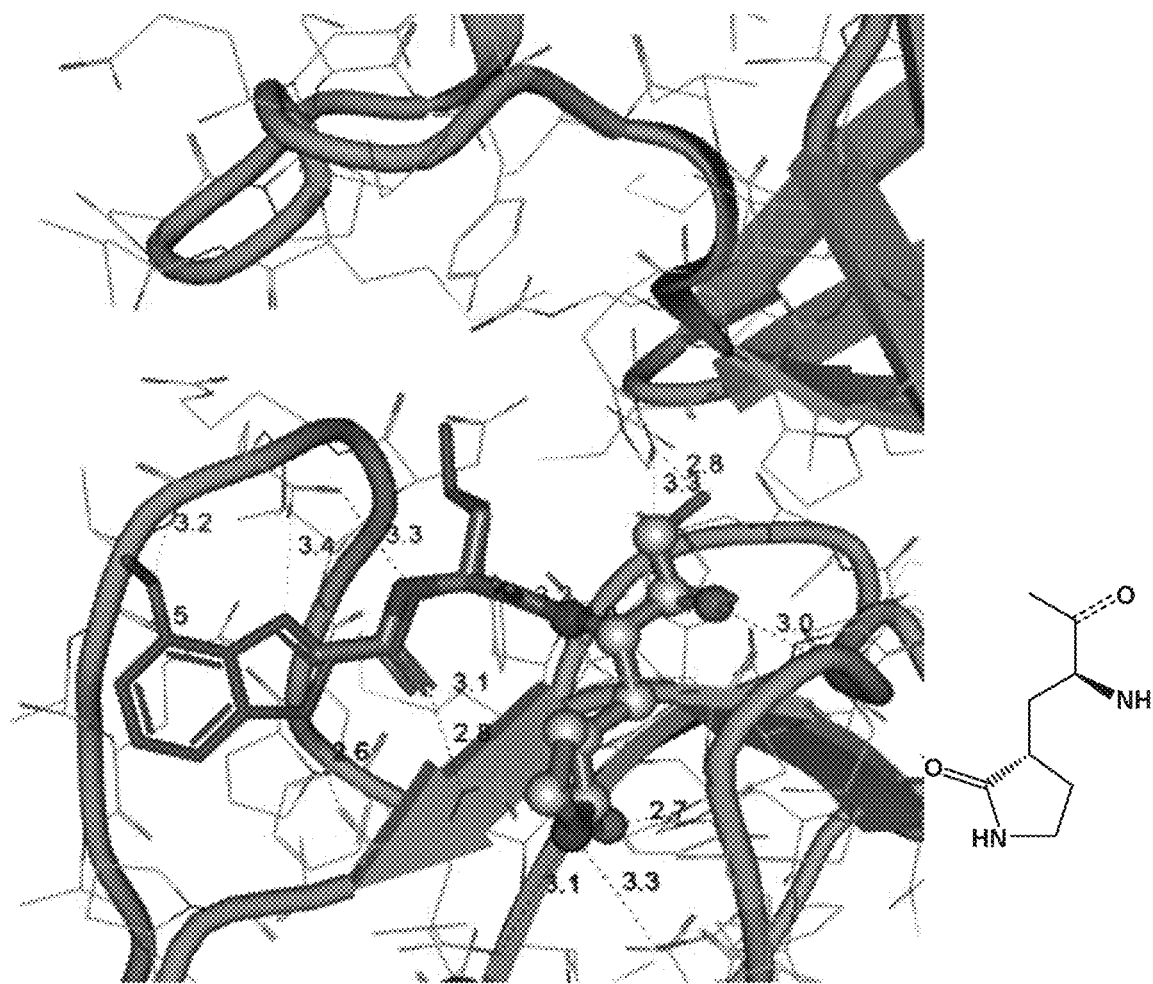
FIG. 2 depicts binding site of homology model of SARS-CoV-2 3CL with a core-docked ligand (Compound B, N-((1S)-1-{[((1S)-3-hydroxy-2-oxo-1-{[(3S)-2-oxopyrrolidin-3-yl]methyl}propyl)amino]carbonyl}-3-methylbutyl)-4-methoxy-1H-indole-2-carboxamide).

FIG. 2. Binding site of homology model of SARS-CoV-2 3CL with a core-docked ligand (Compound B, N-((1S)-1-{[((1S)-3-hydroxy-2-oxo-1-{[(3S)-2-oxopyrrolidin-3-yl]methyl}propyl)amino]carbonyl}-3-methylbutyl)-4-methoxy-1H-indole-2-carboxamide) present (purple carbons, red oxygen, blue nitrogen). Part of the crystal structure of Compound B, N-((1S)-1-{[((1S)-3-hydroxy-2-oxo-1-{[(3S)-2-oxopyrrolidin-3-yl]methyl}propyl)amino]carbonyl}-3-methylbutyl)-4-methoxy-1H-indole-2-carboxamide; (peptide backbone, lactam side chain and attacked ketone) was used to measure the RMSD of the different ligands to that backbone (grey carbons, thick stick). The core used for core docking is shown as 11 heavy atoms in ball representation (light blue carbons) and in the inset chemical structure. Distances shown in Angstroms.

The docking result(s) in Table 2 below indicate that the compound(s) have predicted affinities ($\Delta G_{bind}$, kcal/mol) that are generally commensurate with target recognition and binding. The effective potency can differ from the $\Delta G$ binding terms depending on several factors such as cell uptake, efflux, cofactor competition or substrate competition.

TABLE 2

| Compound | Predicted $\Delta G_{bind}$ (kcal/mol) | Chemical Name of Docked Compounds |
|---|---|---|
| B | −9.5 | N-((1S)-1-{[((1S)-3-hydroxy-2-oxo-1-{[(3S)-2-oxopyrrolidin-3-yl]methyl}propyl)amino]carbonyl}-3-methylbutyl)-4-methoxy-1H-indole-2-carboxamide |

The compounds described above are analyzed by a FRET biochemical assay and by in vitro virological assays using cell culture techniques.

Protection from SARS Infection: Neutral Red Endpoint

The ability of compounds to protect cells against infection by the SARS coronavirus is measured by a cell viability assay similar to that described in Borenfreund, E., and Puerner, J. 1985. Toxicity determined in vitro by morphological alterations and neutral red absorption Toxicology Letters. 24:119-124, utilizing neutral red staining as an endpoint. Briefly, medium containing appropriate concentrations of compound or medium only is added to Vero cells. Cells are infected with SARS-associated virus or mock-infected with medium only. One to seven days later, the medium is removed and medium containing neutral red is added to the test plates. Following incubation at 37° C. for two hours, cells are washed twice with PBS and a 50% EtOH, 1% acetic acid solution is added. The cells are shaken for 1 to 2 minutes and incubated at 37° C. for 5 to 10 minutes. The amount of neutral red is quantified spectrophotometrically at 540 nm. Data is expressed as the percent of neutral red in wells of compound-treated cells compared to neutral red in wells of uninfected, compound-free cells. The fifty percent effective concentration (EC50) is calculated as the concentration of compound that increases the percent of neutral red production in infected, compound-treated cells to 50% of that produced by uninfected, compound-free cells. The 50% cytotoxicity concentration (CC50) is calculated as the concentration of compound that decreases the percentage of neutral red produced in uninfected, compound-treated cells to 50% of that produced in uninfected, compound-free cells. The therapeutic index is calculated by dividing the cytotoxicity (CC50) by the antiviral activity (EC50).

Protection from SARS-CoV-2 Infection: Glo endpoint

The ability of compounds to protect cells against infection by the SARS-CoV-2 coronavirus can also be measured by a cell viability assay utilizing luciferase to measure intracellular ATP as an endpoint. Briefly, medium containing appropriate concentrations of compound or medium only is added to Vero cells. Cells are infected with SARS-CoV-2 virus or mock-infected with medium only. One to seven days later, the medium is removed and the amount of intracellular ATP is measured as per Promega Technical Bulletin No. 288: CellTiter-Glo® Luminescent Cell Viability Assay (Promega, Madison, WI). The CellTiter-Glo® reagent is added to the test plates and following incubation at 37° C. for 1.25 hours, the amount of signal is quantified using a luminometer at 490 nm. Data is expressed as the percent of luminescent signal from wells of compound-treated cells compared to the luminescent signal from wells of uninfected, compound-free cells. The fifty percent effective concentration (EC50) is calculated as the concentration of compound that increases the percent of the luminescent signal from infected, compound-treated cells to 50% of the luminescent signal from uninfected, compound-free cells. The 50% cytotoxicity concentration (CC50) is calculated as the concentration of compound that decreases the percentage of the luminescent signal from uninfected, compound-treated cells to 50% of the luminescent signal from uninfected, compound-free cells. The therapeutic index is calculated by dividing the cytotoxicity (CC50) by the antiviral activity (EC50).

Cytotoxicity

The ability of compounds to cause cytotoxicity in cells is measured by a cell viability assay similar to that described in Weislow, O. S., Kiser, R., Fine, D. L., Bader, J., Shoemaker, R. H., and Boyd, M. R.1989. New Soluble-Formazan Assay for HIV-1 Cytopathic Effects: Application to High-Flux Screening of Synthetic and Natural Products for AIDS-Antiviral Activity. Journal of the National Cancer Institute 81(08): 577-586, utilizing formazan as an endpoint. Briefly, Vero cells are resuspended in medium containing appropriate concentrations of compound or medium only. One to seven days later, XTT and PMS are added to the test plates and following incubation at 37° C. for two hours the amount of formazan produced is quantified spectrophotometrically at nm. Data is expressed as the percent of formazan produced in compound-treated cells compared to formazan produced in wells of compound-free cells. The 50% cytotoxicity concentration (CC50) is calculated as the concentration of compound that decreases the percentage of formazan produced in uninfected, compound-treated cells to 50% of that produced in uninfected, compound-free cells.

Protection from SARS-CoV-2 Coronavirus Infection

The ability of compounds to protect cells against infection by SARS-CoV-2 is measured by a cell viability assay similar to that described in Weislow, O. S., Kiser, R., Fine, D. L., Bader, J., Shoemaker, R. H., and Boyd, M. R.1989. New Soluble-Formazan Assay for HIV-1 Cytopathic Effects: Application to High-Flux Screening of Synthetic and Natural Products for AIDS-Antiviral Activity. Journal of the National Cancer Institute 81(08): 577-586, utilizing formazan as an endpoint. Briefly, medium containing appropriate concentrations of compound or medium only is added to MRC-5 cells. Cells are infected with human coronavirus SARS-CoV-2 or mock-infected with medium only. One to seven days later, XTI and PMS are added to the test plates and following incubation at 37° C. for two hours the amount of formazan produced is quantified spectrophotometrically at 540 nm. Data is expressed as the percent of formazan in wells of compound-treated cells compared to formazan in wells of uninfected, compound-free cells. The fifty percent effective concentration (EC50) is calculated as the concentration of compound that increases the percent of formazan production in infected, compound-treated cells to 50% of that produced by uninfected, compound-free cells. The 50% cytotoxicity concentration (CC50) is calculated as the concentration of compound that decreases the percentage of formazan produced in uninfected, compound-treated cells to 50% of that produced in uninfected, compound-free cells. The therapeutic index is calculated by dividing the cytotoxicity (CC50) by the antiviral activity (EC50).

SARS-CoV-2 Coronavirus 3C Protease FRET Assay and Analysis

The proteolytic activity of the main protease, 3CLpro, of SARS-CoV-2 was monitored using a continuous fluorescence resonance energy transfer (FRET) assay. The SARS-CoV-2 3CLpro assay measures the activity of full-length SARS-CoV-2 3CL protease to cleave a synthetic fluorogenic substrate peptide with the following sequence: Dabcyl-KTSAVLQ-SGFRKME-Edans modelled on a consensus peptide (V. Grum-Tokars et al. Evaluating the 3C-like protease activity of SARS-coronavirus: recommendations for standardized assays for drug discovery. Virus Research 133 (2008) 63-73). The fluorescence of the cleaved Edans peptide (excitation 340 nm/emission 490 nm) is measured using a fluorescence intensity protocol on a Flexstation reader (Molecular Devices). The fluorescent signal is reduced in the present of PF-835231, a potent inhibitor of SARS-CoV-2 3CLpro. The assay reaction buffer contained 20 mM Tris-HCl (pH 7.3), 100 nM NaCl, 1 mM EDTA and 25 µM peptide substrate. Enzyme reactions were initiated with the addition of 15 nM SARS-CoV-2 3CL protease and allowed to proceed for 60 minutes at 23° C. Percent inhibition or activity was calculated based on control wells containing no compound (0% inhibition/100% activity) and a control compound (100% inhibition/0% activity). $IC_{50}$ values were generated using a four-parameter fit model using ABASE software (IDBS). Ki values were fit to the Morrison equation with the enzyme concentration parameter fixed to 15 nM, the Km parameter fixed to 14 µM and the substrate concentration parameter fixed to 25 µM using ABASE software (IDBS).

Proteolytic activity of SARS-CoV-2 Coronavirus 3CL protease is measured using a continuous fluorescence resonance energy transfer assay. The SARS-CoV-2 $3CL^{pro}$ FRET assay measures the protease catalyzed cleavage of TAMRA-SITSAVLQSGFRKMK-(DABCYL)-OH to TAMRA-SITSAVLQ and SGFRKMK(DABCYL)-OH. The fluorescence of the cleaved TAMRA (ex. 558 nm/em. 581 nm) peptide was measured using a TECAN SAFIRE fluorescence plate reader over the course of 10 min. Typical reaction solutions contained 20 mM HEPES (pH 7.0), 1 mM EDTA, 4.0 µM FRET substrate, 4% DMSO and 0.005% Tween-20. Assays were initiated with the addition of 25 nM SARS $3CL^{pro}$ (nucleotide sequence 9985-10902 of the Urbani strain of SARS coronavirus complete genome sequence (NCBI accession number AY278741)). Percent inhibition was determined in duplicate at 0.001 mM level of inhibitor. Data was analyzed with the non-linear regression analysis program Kalidagraph using the equation:

$$FU = \text{offset} + (\text{limit})(1 - e^{-(kobs)}t)$$

where offset equals the fluorescence signal of the un-cleaved peptide substrate, and limit equals the fluorescence of fully cleaved peptide substrate. The kobs is the first order rate constant for this reaction, and in the absence of any inhibitor represents the utilization of substrate. In an enzyme start reaction which contains an irreversible inhibitor, and where the calculated limit is less than 20% of the theoretical maximum limit, the calculated kobs represents the rate of inactivation of coronavirus 3C protease. The slope (kobs/I) of a plot of kobs vs. [I] is a measure of the avidity of the inhibitor for an enzyme. For very fast irreversible inhibitors, kobs/l is calculated from observations at only one or two [I] rather than as a slope.

| Example | 3CL Protease Geometric Mean Ki (nm) | Count Used For Ki (nm) | Compound Name |
| --- | --- | --- | --- |
| 1 | 19.4 | 2 | (3S)-3-({N-[(4-methoxy-1H-indol-2-yl)carbonyl]-L-leucyl}amino)-2-oxo-4-[(3S)-2-oxopyrrolidin-3-yl]butyl acetate |
| 2 | 94.1 | 2 | (3S)-3-({N-[(4-methoxy-1H-indol-2-yl)carbonyl]-L-leucyl}amino)-2-oxo-4-[(3S)-2-oxopyrrolidin-3-yl]butyl pivalate |
| 3 | 233.2 | 2 | (3S)-3-({N-[(4-methoxy-1H-indol-2-yl)carbonyl]-L-leucyl}amino)-2-oxo-4-[(3S)-2-oxopyrrolidin-3-yl] butyl benzoate |
| 4 | 17.7 | 2 | (3S)-3-({N-[(4-methoxy-1H-indol-2-yl)carbonyl]-L-leucyl}amino)-2-oxo-4-[(3S)-2-oxopyrrolidin-3-yl]butyl 4-methylbenzoate |
| 5 | 16.3 | 3 | (3S)-3-({N-[(4-methoxy-1H-indol-2-yl)carbonyl]-L-leucyl}amino)-2-oxo-4-[(3S)-2-oxopyrrolidin-3-yl]butyl 4-fluorobenzoate |
| 6 | 1.9 | 5 | (3S)-3-({N-[(4-methoxy-1H-indol-2-yl)carbonyl]-L-leucyl}amino)-2-oxo-4-[(3S)-2-oxopyrrolidin-3-yl]butyl 4-cyanobenzoate |
| 7 | 33.4 | 2 | (3S)-3-({N-[(4-methoxy-1H-indol-2-yl)carbonyl]-L-leucyl}amino)-2-oxo-4-[(3S)-2-oxopyrrolidin-3-yl]butyl 4-methoxybenzoate |
| 8 | 18.8 | 3 | (3S)-3-({N-[(4-methoxy-1H-indol-2-yl) carbonyl]-L-leucyl}amino)-2-oxo-4-[(3S)-2-oxopyrrolidin-3-yl] butyl 4-chlorobenzoate |
| 9 | 0.3 | 4 | (3S)-3-({N-[(4-methoxy-1H-indol-2-yl)carbonyl]-L-leucyl}amino)-2-oxo-4-[(3S)-2-oxopyrrolidin-3-yl]butyl 2,6-dichlorobenzoate |
| 10 | 3.4 | 5 | (3S)-3-({N-[(4-methoxy-1H-indol-2-yl)carbonyl]-L-leucyl}amino)-2-oxo-4-[(3S)-2-oxopyrrolidin-3-yl]butyl 2,6-dimethylbenzoate |
| 11 | 1.3 | 1 | (3S)-3-({N-[(4-methoxy-1H-Indol-2-yl)carbonyl]-L-leucyl}amino)-2-oxo-4-[(3S)-2-oxopyrrolidin-3-yl]butyl 2,6-difluorobenzoate |

-continued

| Example | 3CL Protease Geometric Mean Ki (nm) | Count Used For Ki (nm) | Compound Name |
|---|---|---|---|
| 12 | 15.7 | 3 | (3S)-3-({N-[(4-methoxy-1H-indol-2-yl)carbonyl]-L-leucyl}amino)-2-oxo-4-[(3S)-2-oxopyrrolidin-3-yl]butyl 2,6-dimethoxybenzoate |
| 13 | NA | NA | (3S)-3-({N-[(4-methoxy-1H-indol-2-yl)carbonyl]-L-leucyl}amino)-2-oxo-4-[(3S)-2-oxopyrrolidin-3-yl]butyl 4-chloro-2-hydroxybenzoate |
| 14 | 0.2 | 1 | (3S)-3-({N-[(4-methoxy-1H-indol-2-yl)carbonyl]-L-leucyl}amino)-2-oxo-4-[(3S)-2-oxopyrrolidin-3-yl]butyl 4-cyano-2-fluorobenzoate |
| 15 | 0.4 | 6 | (3S)-3-({N-[(4-methoxy-1H-indol-2-yl)carbonyl]-L-leucyl}amino)-2-oxo-4-[(3S)-2-oxopyrrolidin-3-yl]butyl 2-cyanobenzoate |

All patents and publications described hereinabove are hereby incorporated by reference in their entirety. While the invention has been described in terms of various preferred embodiments and specific examples, the invention should be understood as not being limited by the foregoing detailed description, but as being defined by the appended claims and their equivalents.

What is claimed is:

1. A method of treating COVID-19 in a patient, the method comprising administering to a patient in need thereof a therapeutically effective amount of a compound selected from the group consisting of:
- (3S)-3-({N-[(4-methoxy-1H-indol-2-yl)carbonyl]-L-leucyl}amino)-2-oxo-4-[(3S)-2-oxopyrrolidin-3-yl] butyl acetate;
- (3S)-3-({N-[(4-methoxy-1H-indol-2-yl)carbonyl]-L-leucyl}amino)-2-oxo-4-[(3S)-2-oxopyrrolidin-3-yl] butyl pivalate;
- (3S)-3-({N-[(4-methoxy-1H-indol-2-yl)carbonyl]-L-leucyl}amino)-2-oxo-4-[(3S)-2-oxopyrrolidin-3-yl] butyl benzoate;
- (3S)-3-({N-[(4-methoxy-1H-indol-2-yl)carbonyl]-L-leucyl}amino)-2-oxo-4-[(3S)-2-oxopyrrolidin-3-yl] butyl 4-methylbenzoate;
- (3S)-3-({N-[(4-methoxy-1H-indol-2-yl)carbonyl]-L-leucyl}amino)-2-oxo-4-[(3S)-2-oxopyrrolidin-3-yl] butyl 4-fluorobenzoate;
- (3S)-3-({N-[(4-methoxy-1H-indol-2-yl)carbonyl]-L-leucyl}amino)-2-oxo-4-[(3S)-2-oxopyrrolidin-3-yl] butyl 4-cyanobenzoate;
- (3S)-3-({N-[(4-methoxy-1H-indol-2-yl)carbonyl]-L-leucyl}amino)-2-oxo-4-[(3S)-2-oxopyrrolidin-3-yl] butyl 4-methoxybenzoate;
- (3S)-3-({N-[(4-methoxy-1H-indol-2-yl)carbonyl]-L-leucyl}amino)-2-oxo-4-[(3S)-2-oxopyrrolidin-3-yl] butyl 4-chlorobenzoate;
- (3S)-3-({N-[(4-methoxy-1H-indol-2-yl)carbonyl]-L-leucyl}amino)-2-oxo-4-[(3S)-2-oxopyrrolidin-3-yl] butyl 2,6-dichlorobenzoate;
- (3S)-3-({N-[(4-methoxy-1H-Indol-2-yl)carbonyl]-L-leucyl}amino)-2-oxo-4-[(3S)-2-oxopyrrolidin-3-yl] butyl 2,6-dimethylbenzoate;
- (3S)-3-({N-[(4-methoxy-1H-indol-2-yl)carbonyl]-L-leucyl}amino)-2-oxo-4-[(3S)-2-oxopyrrolidin-3-yl] butyl 2,6-difluorobenzoate;
- (3S)-3-({N-[(4-methoxy-1H-indol-2-yl)carbonyl]-L-leucyl}amino)-2-oxo-4-[(3S)-2-oxopyrrolidin-3-yl] butyl 2,6-dimethoxybenzoate;
- (3S)-3-({N-[(4-methoxy-1H-indol-2-yl)carbonyl]-L-leucyl}amino)-2-oxo-4-[(3S)-2-oxopyrrolidin-3-yl] butyl 4-chloro-2-hydroxybenzoate;
- (3S)-3-({N-[(4-methoxy-1H-indol-2-yl)carbonyl]-L-leucyl}amino)-2-oxo-4-[(3S)-2-oxopyrrolidin-3-yl] butyl 4-cyano-2-fluorobenzoate; and
- (3S)-3-({N-[(4-methoxy-1H-indol-2-yl)carbonyl]-L-leucyl}amino)-2-oxo-4-[(3S)-2-oxopyrrolidin-3-yl] butyl 2-cyanobenzoate;

or a pharmaceutically acceptable salt thereof.

2. The method of claim 1 wherein the compound or pharmaceutically acceptable salt thereof is administered orally, by inhalation or intranasally.

3. The method of claim 2 wherein the compound or pharmaceutically acceptable salt thereof is administered orally.

4. The method of claim 2 wherein the compound or pharmaceutically acceptable salt thereof is administered by inhalation or intranasally.

5. The method of claim 1 wherein the compound or pharmaceutically acceptable salt thereof is administered sublingually.

6. The method of claim 1 wherein the compound or pharmaceutically acceptable salt thereof is administered one to four times over a 24-hour period.

7. The method of claim 6 further comprising the administration of one or more additional therapeutic agents.

8. The method of claim 7 wherein the additional therapeutic agent is selected from the group consisting of remdesivir and dexamethasone.

9. A method of treating COVID-19 in a patient, the method comprising administering to a patient in need thereof a pharmaceutical composition, the pharmaceutical composition comprising a therapeutically effective amount of a compound selected from the group consisting of:
- (3S)-3-({N-[(4-methoxy-1H-indol-2-yl)carbonyl]-L-leucyl}amino)-2-oxo-4-[(3S)-2-oxopyrrolidin-3-yl] butyl acetate;
- (3S)-3-({N-[(4-methoxy-1H-indol-2-yl)carbonyl]-L-leucyl}amino)-2-oxo-4-[(3S)-2-oxopyrrolidin-3-yl] butyl pivalate;
- (3S)-3-({N-[(4-methoxy-1H-indol-2-yl)carbonyl]-L-leucyl}amino)-2-oxo-4-[(3S)-2-oxopyrrolidin-3-yl] butyl benzoate;
- (3S)-3-({N-[(4-methoxy-1H-indol-2-yl)carbonyl]-L-leucyl}amino)-2-oxo-4-[(3S)-2-oxopyrrolidin-3-yl] butyl 4-methylbenzoate;
- (3S)-3-({N-[(4-methoxy-1H-indol-2-yl)carbonyl]-L-leucyl}amino)-2-oxo-4-[(3S)-2-oxopyrrolidin-3-yl] butyl 4-fluorobenzoate;
- (3S)-3-({N-[(4-methoxy-1H-indol-2-yl)carbonyl]-L-leucyl}amino)-2-oxo-4-[(3S)-2-oxopyrrolidin-3-yl] butyl 4-cyanobenzoate;
- (3S)-3-({N-[(4-methoxy-1H-indol-2-yl)carbonyl]-L-leucyl}amino)-2-oxo-4-[(3S)-2-oxopyrrolidin-3-yl] butyl 4-methoxybenzoate;
- (3S)-3-({N-[(4-methoxy-1H-indol-2-yl)carbonyl]-L-leucyl}amino)-2-oxo-4-[(3S)-2-oxopyrrolidin-3-yl] butyl 4-chlorobenzoate;
- (3S)-3-({N-[(4-methoxy-1H-indol-2-yl)carbonyl]-L-leucyl}amino)-2-oxo-4-[(3S)-2-oxopyrrolidin-3-yl] butyl 2,6-dichlorobenzoate;
- (3S)-3-({N-[(4-methoxy-1H-Indol-2-yl)carbonyl]-L-leucyl}amino)-2-oxo-4-[(3S)-2-oxopyrrolidin-3-yl] butyl 2,6-dimethylbenzoate;
- (3S)-3-({N-[(4-methoxy-1H-indol-2-yl)carbonyl]-L-leucyl}amino)-2-oxo-4-[(3S)-2-oxopyrrolidin-3-yl] butyl 2,6-difluorobenzoate;

(3S)-3-({N-[(4-methoxy-1H-indol-2-yl)carbonyl]-L-leucyl}amino)-2-oxo-4-[(3S)-2-oxopyrrolidin-3-yl]butyl 2,6-dimethoxybenzoate;

(3S)-3-({N-[(4-methoxy-1H-indol-2-yl)carbonyl]-L-leucyl}amino)-2-oxo-4-[(3S)-2-oxopyrrolidin-3-yl]butyl 4-chloro-2-hydroxybenzoate;

(3S)-3-({N-[(4-methoxy-1H-indol-2-yl)carbonyl]-L-leucyl}amino)-2-oxo-4-[(3S)-2-oxopyrrolidin-3-yl]butyl 4-cyano-2-fluorobenzoate; and (3S)-3-({N-[(4-methoxy-1H-indol-2-yl)carbonyl]-L-leucyl}amino)-2-oxo-4-[(3S)-2-oxopyrrolidin-3-yl]butyl 2-cyanobenzoate;

or a pharmaceutically acceptable salt thereof.

10. The method of claim 9 wherein the pharmaceutical composition further comprises an additional therapeutic agent.

11. The method of claim 10 wherein the additional therapeutic agent is selected from the group consisting of remdesivir and dexamethasone.

12. The method of claim 9 wherein the pharmaceutical composition is administered orally.

13. The method of claim 9 wherein the pharmaceutical composition is administered by inhalation or intranasally.

14. The method of claim 7 wherein the one or more additional therapeutic agent is selected from the group consisting of remdesivir, galidesivir, favilavir/avifavir, mulnupiravir (MK-4482/EIDD 2801), AT-527, AT-301, BLD-2660, favipiravir, camostat, SLV213 emtrictabine/tenofivir, clevudine, dalcetrapib, boceprevir, ABX464, dexamethasone, hydrocortisone, convalescent plasma, gelsolin (Rhu-p65N), monoclonal antibodies, regdanvimab (Regkirova), ravulizumab (Ultomiris), VIR-7831/VIR-7832, BRII-196/BRII-198, COVI-AMG/COVI DROPS (STI-2020), bamlanivimab (LY-CoV555), mavrilimab, leronlimab (PRO140), AZD7442, lenzilumab, infliximab, adalimumab, JS 016, STI-1499 (COVIGUARD), lanadelumab (Takhzyro), canakinumab (llaris), gimsilumab, otilimab, casirivimab/imdevimab (REGN-Cov2), MK-7110 (CD24Fc/SACCOVID), heparin, apixaban, tocilizumab (Actemra), sarilumab (Kevzara), apilimod dimesylate, DNL758, PB1046, dapaglifozin, abivertinib, ATR-002, bemcentinib, acalabrutinib, baricitinib, losmapimod, famotidine, niclosamide and diminazene.

15. The method of claim 14 wherein the one or more additional agent is selected from the group consisting of remdesivir, dexamethasone, malnupiravir, bamlanivimab and baricitinib.

16. The method of claim 10 wherein the pharmaceutical composition is administered orally.

17. The method of claim 11 wherein the pharmaceutical composition is administered orally.

18. The method of claim 10 wherein the pharmaceutical composition is administered by inhalation or intranasally.

19. The method of claim 11 wherein the pharmaceutical composition is administered by inhalation or intranasally.

20. The method of claim 10 wherein the one or more additional therapeutic agent is selected from the group consisting of remdesivir, galidesivir, favilavir/avifavir, mulnupiravir (MK-4482/EIDD 2801), AT-527, AT-301, BLD-2660, favipiravir, camostat, SLV213 emtrictabine/tenofivir, clevudine, dalcetrapib, boceprevir, ABX464, dexamethasone, hydrocortisone, convalescent plasma, gelsolin (Rhu-p65N), monoclonal antibodies, regdanvimab (Regkirova), ravulizumab (Ultomiris), VIR-7831/VIR-7832, BRII-196/BRII-198, COVI-AMG/COVI DROPS (STI-2020), bamlanivimab (LY-CoV555), mavrilimab, leronlimab (PRO140), AZD7442, lenzilumab, infliximab, adalimumab, JS 016, STI-1499 (COVIGUARD), lanadelumab (Takhzyro), canakinumab (llaris), gimsilumab, otilimab, casirivimab/imdevimab (REGN-Cov2), MK-7110 (CD24Fc/SACCOVID), heparin, apixaban, tocilizumab (Actemra), sarilumab (Kevzara), apilimod dimesylate, DNL758, PB1046, dapaglifozin, abivertinib, ATR-002, bemcentinib, acalabrutinib, baricitinib, losmapimod, famotidine, niclosamide and diminazene.

21. The method of claim 20 wherein the one or more additional agent is selected from the group consisting of remdesivir, dexamethasone, malnupiravir, bamlanivimab and baricitinib.

* * * * *

SEQUENCE LISTING

<160> NUMBER OF SEQ ID NOS: 2

<210> SEQ ID NO 1
<211> LENGTH: 306
<212> TYPE: PRT
<213> ORGANISM: Homo sapiens

<400> SEQUENCE: 1

```
Ser Gly Phe Arg Lys Met Ala Phe Pro Ser Gly Lys Val Glu Gly Cys
1               5                   10                  15
Met Val Gln Val Thr Cys Gly Thr Thr Thr Leu Asn Gly Leu Trp Leu
                20                  25                  30
Asp Asp Thr Val Tyr Cys Pro Arg His Val Ile Cys Thr Ala Glu Asp
            35                  40                  45
Met Leu Asn Pro Asn Tyr Glu Asp Leu Leu Ile Arg Lys Ser Asn His
        50                  55                  60
Ser Phe Leu Val Gln Ala Gly Asn Val Gln Leu Arg Val Ile Gly His
65                  70                  75                  80
Ser Met Gln Asn Cys Leu Leu Arg Leu Lys Val Asp Thr Ser Asn Pro
                85                  90                  95
Lys Thr Pro Lys Tyr Lys Phe Val Arg Ile Gln Pro Gly Gln Thr Phe
            100                 105                 110
Ser Val Leu Ala Cys Tyr Asn Gly Ser Pro Ser Gly Val Tyr Gln Cys
        115                 120                 125
Ala Met Arg Pro Asn His Thr Ile Lys Gly Ser Phe Leu Asn Gly Ser
    130                 135                 140
Cys Gly Ser Val Gly Phe Asn Ile Asp Tyr Asp Cys Val Ser Phe Cys
145                 150                 155                 160
Tyr Met His His Met Glu Leu Pro Thr Gly Val His Ala Gly Thr Asp
                165                 170                 175
Leu Glu Gly Lys Phe Tyr Gly Pro Phe Val Asp Arg Gln Thr Ala Gln
            180                 185                 190
Ala Ala Gly Thr Asp Thr Thr Ile Thr Leu Asn Val Leu Ala Trp Leu
        195                 200                 205
Tyr Ala Ala Val Ile Asn Gly Asp Arg Trp Phe Leu Asn Arg Phe Thr
    210                 215                 220
Thr Thr Leu Asn Asp Phe Asn Leu Val Ala Met Lys Tyr Asn Tyr Glu
225                 230                 235                 240
```

```
Pro Leu Thr Gln Asp His Val Asp Ile Leu Gly Pro Leu Ser Ala Gln
                245                 250                 255

Thr Gly Ile Ala Val Leu Asp Met Cys Ala Ala Leu Lys Glu Leu Leu
            260                 265                 270

Gln Asn Gly Met Asn Gly Arg Thr Ile Leu Gly Ser Thr Ile Leu Glu
            275                 280                 285

Asp Glu Phe Thr Pro Phe Asp Val Val Arg Gln Cys Ser Gly Val Thr
290                 295                 300

Phe Gln
305

<210> SEQ ID NO 2
<211> LENGTH: 306
<212> TYPE: PRT
<213> ORGANISM: Homo sapiens

<400> SEQUENCE: 2

Ser Gly Phe Arg Lys Met Ala Phe Pro Ser Gly Lys Val Glu Gly Cys
1               5                   10                  15

Met Val Gln Val Thr Cys Gly Thr Thr Thr Leu Asn Gly Leu Trp Leu
            20                  25                  30

Asp Asp Val Val Tyr Cys Pro Arg His Val Ile Cys Thr Ser Glu Asp
        35                  40                  45

Met Leu Asn Pro Asn Tyr Glu Asp Leu Leu Ile Arg Lys Ser Asn His
    50                  55                  60

Asn Phe Leu Val Gln Ala Gly Asn Val Gln Leu Arg Val Ile Gly His
65                  70                  75                  80

Ser Met Gln Asn Cys Val Leu Lys Leu Lys Val Asp Thr Ala Asn Pro
                85                  90                  95

Lys Thr Pro Lys Tyr Lys Phe Val Arg Ile Gln Pro Gly Gln Thr Phe
            100                 105                 110

Ser Val Leu Ala Cys Tyr Asn Gly Ser Pro Ser Gly Val Tyr Gln Cys
            115                 120                 125

Ala Met Arg Pro Asn Phe Thr Ile Lys Gly Ser Phe Leu Asn Gly Ser
130                 135                 140

Cys Gly Ser Val Gly Phe Asn Ile Asp Tyr Asp Cys Val Ser Phe Cys
145                 150                 155                 160

Tyr Met His His Met Glu Leu Pro Thr Gly Val His Ala Gly Thr Asp
                165                 170                 175

Leu Glu Gly Asn Phe Tyr Gly Pro Phe Val Asp Arg Gln Thr Ala Gln
            180                 185                 190

Ala Ala Gly Thr Asp Thr Thr Ile Thr Val Asn Val Leu Ala Trp Leu
            195                 200                 205

Tyr Ala Ala Val Ile Asn Gly Asp Arg Trp Phe Leu Asn Arg Phe Thr
210                 215                 220

Thr Thr Leu Asn Asp Phe Asn Leu Val Ala Met Lys Tyr Asn Tyr Glu
225                 230                 235                 240

Pro Leu Thr Gln Asp His Val Asp Ile Leu Gly Pro Leu Ser Ala Gln
                245                 250                 255

Thr Gly Ile Ala Val Leu Asp Met Cys Ala Ser Leu Lys Glu Leu Leu
            260                 265                 270
```

```
Gln Asn Gly Met Asn Gly Arg Thr Ile Leu Gly Ser Ala Leu Leu Glu
        275                 280                 285

Asp Glu Phe Thr Pro Phe Asp Val Val Arg Gln Cys Ser Gly Val Thr
    290                 295                 300

Phe Gln
305
```